United States Patent [19]
Loch et al.

[11] Patent Number: 6,143,216
[45] Date of Patent: Nov. 7, 2000

[54] BATTERIES WITH POROUS COMPONENTS

[75] Inventors: Robert B. Loch, Woodbury; James M. Larson, St. Paul; Brian D. Fredericksen, Delano, all of Minn.

[73] Assignee: 3M Innovative Properties Company, St. Paul, Minn.

[21] Appl. No.: 09/292,556

[22] Filed: Apr. 15, 1999

Related U.S. Application Data

[62] Division of application No. 08/948,573, Oct. 10, 1997.

[51] Int. Cl.⁷ .............................. B29C 59/00; B29D 65/00
[52] U.S. Cl. ......................... 264/45.1; 264/122; 264/126
[58] Field of Search .................................. 264/45.1, 120, 264/122, 126

[56] References Cited

U.S. PATENT DOCUMENTS

| | | |
|---|---|---|
| 3,314,820 | 4/1967 | Smith . |
| 3,508,967 | 4/1970 | Lyall et al. . |
| 4,153,661 | 5/1979 | Ree et al. ................................. 264/120 |
| 4,206,980 | 6/1980 | Krueger et al. ......................... 350/359 |
| 4,465,533 | 8/1984 | Covitch ..................................... 165/83 |
| 4,518,665 | 5/1985 | Fujita et al. .............................. 429/53 |
| 4,539,256 | 9/1985 | Shipman .............................. 428/315.5 |
| 4,565,663 | 1/1986 | Errede et al. ........................... 264/120 |
| 4,654,281 | 3/1987 | Anderman et al. ..................... 429/209 |
| 4,668,595 | 5/1987 | Yoshino et al. . |
| 4,726,989 | 2/1988 | Mrozinski ............................ 428/315.5 |
| 4,728,588 | 3/1988 | Noding et al. .......................... 429/127 |
| 4,731,310 | 3/1988 | Anderman et al. . |
| 4,735,875 | 4/1988 | Anderman et al. . |
| 4,782,584 | 11/1988 | Mohri et al. .............................. 29/621 |
| 4,791,037 | 12/1988 | Anderman . |
| 4,853,305 | 8/1989 | Anderman et al. ..................... 429/212 |
| 4,863,792 | 9/1989 | Mrozinski ............................ 428/315.5 |
| 4,867,881 | 9/1989 | Kinzer ..................................... 210/490 |
| 4,923,737 | 5/1990 | De La Torre ....................... 264/300 X |
| 4,925,752 | 5/1990 | Fauteux et al. . |
| 5,004,657 | 4/1991 | Yoneda et al. . |
| 5,100,746 | 3/1992 | Muller et al. .............................. 429/94 |
| 5,130,342 | 7/1992 | McAllister et al. ....................... 521/61 |
| 5,143,805 | 9/1992 | Anderman et al. ..................... 429/217 |
| 5,147,539 | 9/1992 | Hagen et al. ......................... 210/198.3 |
| 5,219,678 | 6/1993 | Hasebe et al. ............................. 429/59 |
| 5,296,318 | 3/1994 | Gozdz et al. . |
| 5,326,652 | 7/1994 | Lake ....................................... 429/127 |
| 5,378,557 | 1/1995 | Murata et al. .......................... 429/127 |
| 5,401,595 | 3/1995 | Kagawa et al. ......................... 429/152 |
| 5,418,091 | 5/1995 | Gozdz et al. ........................... 429/252 |
| 5,429,891 | 7/1995 | Gozdz et al. . |

(List continued on next page.)

FOREIGN PATENT DOCUMENTS

| | | |
|---|---|---|
| 2134052 | 4/1995 | Canada . |
| 0 056 725 | 7/1982 | European Pat. Off. . |
| 0 146 764 | 7/1985 | European Pat. Off. . |
| 0 243 653 | 11/1987 | European Pat. Off. . |
| 0 492 586 A2 | 7/1992 | European Pat. Off. . |
| 0 730 316 A1 | 9/1996 | European Pat. Off. . |
| 0 803 925 A1 | 10/1997 | European Pat. Off. . |
| 96/07213 | 3/1996 | WIPO . |
| 97/43795 | 11/1997 | WIPO . |

OTHER PUBLICATIONS

Thin Film Solid Electrolytes and Elecrodes for Rechargeable Lithium Ion Batteries by J. Schoonman and E.M. Kelder, Delft University of Technology, Laboratory for Applied Inorganic Chemistry, Julianalaan 136, 2628 BL Delft, The Netherlands, pp. 44–47, (Jun. 1999).

*Primary Examiner*—Stephen Kalafut
*Attorney, Agent, or Firm*—Daniel R. Pastirik

[57] ABSTRACT

Approaches are described for producing porous, polymer electrodes with good characteristics for incorporation into polymer batteries. Two preferred processes are presented. The polymer electrodes can be subjected to additional processing to increase their porosity and electrical conductivity. The polymer electrodes preferably are incorporated into a polymer battery where the components are laminated together.

9 Claims, 17 Drawing Sheets

U.S. PATENT DOCUMENTS

| | | | |
|---|---|---|---|
| 5,437,692 | 8/1995 | Dasgupta et al. | 29/623.1 |
| 5,456,000 | 10/1995 | Gozdz et al. | 29/623.2 |
| 5,460,904 | 10/1995 | Gozdz et al. . | |
| 5,470,357 | 11/1995 | Schmutz et al. | 29/523.5 |
| 5,478,668 | 12/1995 | Gozdz et al. | 429/127 |
| 5,503,946 | 4/1996 | Fauteux et al. | 429/50 |
| 5,540,741 | 7/1996 | Gozdz et al. | 29/623.5 |
| 5,541,022 | 7/1996 | Mizumoto et al. . | |
| 5,552,243 | 9/1996 | Klein | 429/157 |
| 5,571,634 | 11/1996 | Gozdz et al. . | |
| 5,587,253 | 12/1996 | Gozdz et al. . | |
| 5,601,949 | 2/1997 | Fujimoto et al. . | |
| 5,746,954 | 5/1998 | Aikman | 264/122 X |

BATTERIES WITH POROUS COMPONENTS

This is a divisional of application Ser. No. 08/948,573 filed Oct. 10, 1997.

FIELD OF THE INVENTION

The invention relates to batteries and polymeric electrodes.

BACKGROUND OF THE INVENTION

In an increasingly mobile and technologically advanced society, batteries are playing an ever more important role. The importance of rechargeable, i.e., secondary, batteries is growing especially quickly due to the use of cellular phones, portable computers and the like. Along with the increased use of batteries, demand is growing for batteries with improved performance capability such as longer use on a single charge. Since batteries are typically used for mobile uses, size and weight considerations are significant.

SUMMARY OF THE INVENTION

In a first aspect, the invention features an article for use in a battery including a laminate, the laminate including:
(a) a porous, polymeric separator disposed between a first polymeric electrode and a second polymeric electrode, at least one of the electrodes comprising a porous polymer matrix, where at least one of the electrodes has a resistivity from about 200 ohm-cm to about 0.1 ohm-cm; and
(b) a lithium salt electrolyte.

Both the first polymeric electrode and the second polymeric electrode can comprise porous polymer matrices. The porous polymer matrix can comprise polypropylene, polyethylene or polyvinylidene fluoride. The porous polymer matrix can comprise a thermoplastic polymer, electrically conductive particles and redox active particles, where the redox active particles and the electrically conductive particles are chemically distinct. The porous polymer matrix can comprise a polyolefin. The electrolyte can includes a liquid composition or a gel composition.

Generally, one of the electrodes includes a cathode active material and the other of the electrodes includes an anode active material. At least one of the polymeric electrodes preferably includes between about 2 percent and about 12 percent by weight electrically conductive particles. At least one of the electrodes preferably comprises a porous polymer having a distribution of pore sizes between about $0.01\mu$ and about $5\mu$ when measured by mercury porosimetry. The article can further include a pair of current collectors with one of the current collectors in electrical contact with each of the electrodes.

In another aspect the invention features a method of producing a battery component comprising laminating together a pair of polymer electrodes and a polymer separator such that the polymer separator is disposed between the electrodes, at least one element of the polymer electrodes comprising a porous polymer matric. The polymer separator can comprise a porous polymer element. One of the electrodes preferably includes a lithium ion-cathode active material and the other of the electrodes preferably includes a lithium ion-anode active material. The electrodes can include a polyolefin. The lamination can involve heat lamination, pressure lamination, coextrusion, solvent lamination and mixtures thereof.

In another aspect the invention features a porous, polymer electrode including a polymeric compound and from about 2 percent to about 15 percent by weight of conducting particles, the electrode having a void volume from about 20 percent to about 60 percent, and a maximum pore size of 5 microns. The porous, polymer electrode can include a lithium ion-active material. The porous, polymer electrode can include greater than about 60 percent lithium ion-cathode active material or greater than about 60 percent lithium ion-anode active material. The porous, polymer electrode can further include a conductive current collector embedded in the porous, polymer composition.

In another aspect the invention features a porous, polymer cathode including:
(a) a polymeric compound;
(b) between about 60 percent and about 94 percent by weight electrically insulating or semiconducting particles, which comprise a cathode-active material; and
(c) between about 1 percent and about 15 percent by weight electrically conductive particles.

The electrically conductive particles can include electrically conductive carbon. The porous, polymer cathode can include between about 5 percent and about 12 percent by weight electrically conductive particles.

In another aspect, the invention features an isolated porous, polymer anode including:
(a) a polymeric compound;
(b) between about 60 percent and about 94 percent by weight particles, which comprise an anode active material; and
(c) greater than about 1 percent by weight electrically conductive particles, chemically distinct from the anode active material.

The electrically conductive particles can include nongraphitic carbon. The anode active material can include graphite.

In another aspect, the invention features a method of producing a porous, polymer electrode comprising cooling a composition that comprises a melt blend of a polymer, redox active particles, electrically conductive particles chemically distinct from the redox active particles and a solubilizing amount of a diluent to induce a phase transition, the polymer comprising polyethylene, polypropylene, poly(tetrafluoroethylene-co-perfluoro-(propyl vinyl ether)) or polyvinylidine fluoride. The electrically conductive particles include electrically conductive carbon. The method can further include the step of removing the diluent.

In the method, the porous polymer electrode upon removing the diluent can include between about 1 percent by weight and about 12 percent by weight electrically conductive particles. Similarly, the porous, polymer electrode upon removing the diluent can include between about 60 percent and 94 percent by weight redox active particles. The cooling step can be performed in the presence of a conductive current collector such that the current collector is embedded in the porous, polymer electrode.

In another aspect, the invention features a method of producing a porous, polymer article comprising heating a porous, polymer film to a temperature within about 20° C. of the melting point of the polymer for a time sufficient to increase the bubble point without substantially altering structural integrity of the film, where the film includes at least about 25 percent by volume particles such as carbonaceous or silicaceous material. The method can further-including calendering the porous, polymer film to reduce void volume.

In another aspect the invention features a method of producing a porous polymer electrode including the steps of:

a) forming a blend of lubricant, a swellable-fibril-forming polymer and redox active particles, the blend having a cohesive consistency and the lubricant being present in an amount exceeding the adsorptive and absorptive capacity of particulates by at least 3 weight percent;

b) intensively mixing thee blend at a temperature and for a time sufficient to cause initial fibrillation of the polymer; and c) biaxially calendering the mass between gaps in calendering rolls maintained at a temperature and for a time to cause additional fibrillation of the polymer, the calendering step being repeated to form a self-supporting tear resistant sheet.

In another aspect, the invention features a conductive adhesive comprising a polyethylene latex and carbon particles.

Preferred porous electrodes are capable of handling a high current density, a high conductivity and a high loading of active material while maintaining good mechanical strength. Preferred batteries are produced using preferred electrodes laminated on either side of a polymer separator. Batteries produced from preferred porous electrodes are capable of producing a high current. Preferred batteries also have a high capacity for a given size and weight with respect to total current produced by the battery on a single charge. Rechargeable batteries can be produced from the preferred electrodes by incorporating appropriate active materials into the battery.

DESCRIPTION OF THE PREFERRED EMBODIMENTS

A. Battery Structure

Figure 1:
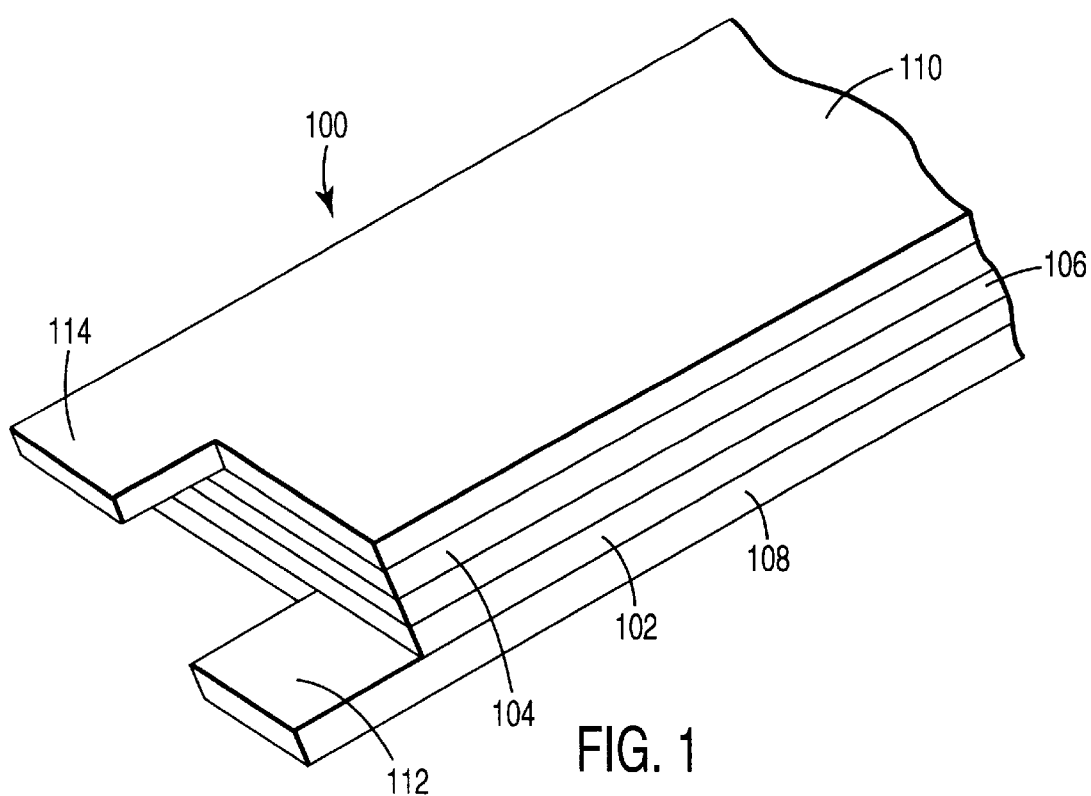
FIG. 1 is a fragmentary, perspective view of an embodiment of a battery of the invention.

Referring to FIG. 1, battery 100 has an anode 102 and a cathode 104 on opposite sides of a separator 106. Current collectors 108, 110 are attached to the anode 102 and cathode 104, respectively. Current collectors provide electrical contact of external elements with the battery. The shape and size of the components of the battery can vary over a wide range.

The reduction/oxidation (radox) chemical reactions that power the cell occur at the electrodes, i.e. anode and cathode. The electrodes are electrically conductive to provide electrical contact with the current collectors. The separator prevents contact of anode active compositions and cathode active compositions. It is important to prevent even minimal contact of reactants, which could lead to electrical shorts resulting in degradation of cell performance.

In alternative embodiments, a plurality of anodes, cathodes and/or separators can be combined into a single cell, for example, two cathodes and two separators surrounding a single anode. Also a plurality of current collectors can be used for each electrode. A plurality of cells can be combined either in parallel or in series to increase capacity or voltage.

The batteries described here use at least one porous polymer component. The porous component can be the anode, cathode or separator. In preferred embodiments, more than one component is porous. More preferably, both of the electrodes and the separator are porous. Generally, the anode/separator/cathode structure are flexible.

Preferred porous components are made using fabrication methods incorporating appropriately selected materials, as described below. These porous components provide high transport rates of ions through the cell. At the same time, they provide a string, yet flexible material that can be conveniently fabricated into the battery. Furthermore, preferred porous electrodes can have both a very high loading of electroactive material and good electrical conductivity, which is needed to interface well with current collectors.

To complete the battery, an electrolyte is needed. The electrolyte supports ionic conduction through the battery to maintain electrical neutrality in view of the charge flow between the electrodes. The preferred form of the constituents of the electrolyte depends on the nature of the reactions at the electrodes.

The electrolyte can take a variety of forms or combination of forms. For example, a solid electrolyte is a polymer material that transports ions. A solid electrolyte also can function as the separator. A solid electrolyte used alone would not take full advantage of the porosity with respect to any of the components, so other forms of electrolyte would be preferred, either alone or combined with a solid electrolyte. To the extent that the polymer is swelled by a plasticizer, the electrolyte can be a gel. See, for example, U.S. Pat. No. 5,418,091 (vinylidene copolymers), U.S. Pat. No. 4,830,939 (acrylate polymers) and U.S. Pat. No. 4,303,748 (acrylated ethylene oxide and propylene oxide polymers), each of which is incorporated herein by reference. In other embodiments, the electrolyte is a liquid.

The various components can be adapted to construct batteries based on a variety of different electrochemical-redox reactions. A half reaction takes place at each electrode. Each redox reaction defines suitable anode active compositions, cathode active compositions and electrolytes.

The components should be selected to be compatible with the reactants. For example, for a lead acid battery, polymers should be selected to be resistant to the corrosive environment. Corrosion resistant polymers include polyvinylidene fluoride, poly(tetrafluoroethylene-co-perflouro-(propyl vinyl ether)), polypropylene, polyethylene and ultrahigh molecular weight polyethylene.

The batteries of the invention can use essentially any redox reactions, for example, those used in conventional lead acid batteries and alkaline batteries. Of particular interest are redox reactions involving lithium ions. Reactions involving lithium ions provide particularly useful voltages, reactions appropriate for a rechargeable battery and a high capacity per weight. Other suitable redox reactions can be based on multivalent ions such as divalent alkali earth ions as described in U.S. Pat. No. 5,601,949, incorporated herein by reference.

Suitable anode active materials for lithium ion cells include, for example, graphitic carbon, amorphous carbon, $TiS_2$, $LiTiS_2$, $WO_2$, $Li_xFe(Fe_2)O_4$, lithium compound of $Fe_2O_3$, other iron oxides, $Nb_2O_5$ amorphous $V_2O_4$, and other chalcogenides having their basic crystal structure changed by intercalation of a lithium ion. Other preferred anode active materials include materials containing one or more types of atoms from groups IIIB, IVB or VB of the period table, as described in Canadian Patent Application 2,134,052.

Suitable cathode active materials for lithium ion batteries include, for example, $LiCoO_2$, $LiNiO_2$, $LiMn_2O_4$ and $LiCo_xN_{1-}O_2$. Appropriate electrolytes include, for example, lithium salts of $PF_6$, $BF_4$, $ClO_4$, $AsF_6$, $N(SO_2C_2F_5)_2$ at on the order of 1 molar concentrations in solvents such as ethylene carbonate, propylene carbonate, dimethyl carbonate, diethyl carbonate, and diethoxy ethane.

B. Electrodes

Each electrode includes a polymer and a redox active composition. The electrodes, in general, can be either porous or nonporous. Appropriate solid electrodes are described, for example, in U.S. Pat. No. 5,460,904. Solid electrodes absorb ions as needed to support the progressing reactions.

Preferred electrodes are porous to increase the effective surface area contacting the electrolyte. The enlarged surface area increases the current density that can be produced by the electrode.

It is preferred to have pores with diameters generally from about 0.01 microns to about 1 micron. Correspondingly, the porous electrodes preferably have a void volume from about 10 percent to about 50 percent and more preferably from about 25 percent to about 35 percent. Void volume as a percent is calculated by the following formula:

$$\text{Void Volume} = [1 - AD/MD] \times 100.$$

MD is the average density of the materials, based on the relative weights of the components in the electrode and their density. AD is the actual, measured density of the electrode.

Because of the improved physical and electrical properties of the porous electrodes produced using the methods described below, thicker electrodes can be used while retaining good performance. Thicker electrodes provide for the use of relatively less separator material while obtaining the same battery capacity and appropriate currents. The electrodes preferably have a thickness between about 0.001 inch (1 mils) and about 0.050 inch (50 mils) thick and more preferably between about 0.005 inch (5 mils) and about 0.025 inch (25 mils). The electrodes can be take on any size and shape appropriate to construct the desired battery.

The redox active compositions generally are particles dispersed in the polymer matrix. Preferred polymers are inert with respect to the chemical reactants within the cell. Preferred $Li^{+1}$ ion batteries involve compounds that can react with polymers containing active groups. Therefore, preferred polymers for lithium ion batteries involve polymers, such as polyolefins, with no significant functional groups. Preferred polymers include, for example, polyethylene, polytetrafluoroethylene, poly(tetrafluoroethylene-co-perfluoro-(propyl vinyl ether)), polypropylene, polyvinylidine fluoride and copolymers of these materials.

Polymer electrodes preferably have a high loading of particles. The polymer generally forms a matrix joining together the particles. The electrodes preferably contain between about 50 percent and about 98 percent by weight, and more preferably between about 75 percent and about 95 percent by weight particles. Preferably these particles have a size less than 100 microns, and more preferably between 0.1 microns and 10 microns.

A majority of the particles generally are active materials in the redox reactions appropriate cathode active and anode active materials are described above with respect to the different reduction and oxidation reactions suitable for the battery.

The redox active particles in the electrodes may or may not be electrically conductive. Since the electrode is conductive, the redox active components preferably are conductive, but this may not be possible or convenient. It generally is preferable or necessary to add nonreactive or weakly reactive conducting particles in addition to the redox active compositions. Preferred conductive particles include carbon particles such as carbon black, graphite, hard carbon and carbon fibers.

Preferably, these conductive particles are included in quantities between about 2 percent and about 15 percent, and more preferably for cathodes between about 5 percent and about 12 percent and for anodes between about 2 percent and about 10 percent by weight of the electrode composition. Because of the desirable structure of the present electrodes, relatively small quantities of conductive particles can be used to obtain electrodes with useful values of conductivity.

Preferably, the electrodes have a resistivity from about 200 ohm-cm to about 0.1 ohm-cm and more preferably from about 50 ohm-cm to about 0.1 ohm-cm. Furthermore, the electrodes preferably have Gurley values from about 400 sec/50 cc to about 10 sec/50 cc and more preferably from about 60 sec/50 cc to about 10 sec/50 cc.

Two processes for the production of porous electrodes are described next.

1. TIPT Process

The first process for the production of porous electrodes involves a thermally induced phase transition (TIPT). The TIPT process is based on the use of a polymer that is soluble in a diluent at an elevated temperature and insoluble in the diluent at a relatively lower temperature. The "phase transition" can involve a solid-liquid phase separation, a liquid—liquid phase separation or a liquid to a gel phase transition. The "phase transition" need not involve a discontinuity in a thermodynamic variable so that transitions from one phase to another that occur above a triple point or the like are also considered to be "phase transitions".

Suitable polymers for the TIPT process include thermoplastic polymers, thermosensitive polymers or mixtures of polymers of these types, with the mixed polymers being compatible. Thermosensitive polymers such as ultrahigh molecular weight polyethylene (UHMWPE) cannot be melt-processed directly but can be melt processed in the presence of a diluent or plasticizer that lowers the viscosity sufficiently for melt processing. Suitable polymers can be crystalline or amorphous. Representative polymers include high and low density polyethylene, polypropylene, polybutadiene, polyacrylates such as polymethylmethacrylate, polyvinylidene fluoride, poly (tetrafluoroethylene-co-perfluoro-(propyl vinyl ether)) (sold as Teflon® PFA), and mixtures and copolymers thereof.

Suitable diluents are liquids or solids at room temperature and liquids at the melting temperature of the polymer. Low molecular weight diluents are preferred since they can be extracted more readily than higher molecular weight diluents. Low to moderate molecular weight polymers, however, can be used as diluents if the diluent polymer and the matrix polymer are miscible in the melt state. Compounds with boiling points below the melting temperature of the polymer can be used as dilients by using a superatmospheric pressure sufficient to produce a liquid at the polymer melting temperature.

The compatibility of the (diluent with the polymer can be evaluated by mixing the polymer and the diluent while heating to determine whether a single liquid phase is formed, as indicated generally by existence of a clear homogeneous solution. An appropriate polymer dissolves or forms a single phase with the diluent at the melting temperature of the polymer but forms a continuous network on cooling to a temperature below the melting temperature of the polymer. The continuous network is either a separate phase from the diluent or a gel where the diluent acts as a plasticizer swelling the polymer network. The gel state may be considered to be a single phase.

For non-polar polymers, non-polar organic liquids generally are preferred as a diluent. Similarly, polar organic liquids generally are preferred with polar polymers. When blends of polymers are used, preferred diluents are compatible with each of the polymers. When the polymer is a block copolymer, the diluent preferably is compatible with each polymer block. Blends of two or more liquids can be used as the diluent as long as the polymer is soluble in the liquid blend at the melt temperature of the polymer, and a phase transition with the formation of a polymer network occurs upon cooling.

Various organic compounds are useful as a diluent, including compounds from the following broad classifications: aliphatic acids; aromatic acids; aliphatic alcohols; aromatic alcohols; cyclic alcohols; aldehydes; primary amines; secondary amines; aromatic amines; ethoxylated amines; diamines; amiies; esters and diesters such as sebacates, phthalates, stearates, adipates and citrates; ethers; ketones; epoxy compounds such as epoxidized vegetable oils; phosphate esters such as tricresyl phosphate; various hydrocarbons such as eicosane, coumarin-idene resins and terpene resins and blends such as petroleum oil including lubricating oils and fuel oils, hydrocarbon resin and asphalt; and various heterocyclic compounds.

-Examples of particular blends of polymers and diluents that are useful in preparing suitable porous materials include polypropylene with aliphatic hydrocarbons such as mineral oil and mineral spirits, waxes, esters such as dioctyl phthalate and dibutyl ohthalate, or ethers such as dibenzyl ether; ultrahigh molecular weight polyethylene with mineral oil or waxes; high density polyethylene with aliphatic hydrocarbons such as mineral oil, aliphatic ketones such as methyl nonyl ketone, or an ester such as dioctyl phthalate; low density polyethylene with aliphatic acids such as decanoic acid and oleic acid, or primary alcohols such as decyl alcohol; polypropylene-polyethylene copolymer with mineral oil; and pdlyvinylidene fluoride with dibutyl phthalate.

A particular combination (of polymer and diluent may include more than one polymer and/or more than one diluent. Mineral oil and mineral spirits are each examples of a diluent being a mixture of compounds since they are typically blends of hydrocarbon liquids. Similarly, blends of liquids and solids also can serve as the diluent.

For thermoplastic polymerize the melt blend preferably includes from about 10 parts to about 80 parts by weight of the thermoplastic polymer and from about 90 to about 20 parts by weight of the diluent. Appropriate relative amounts of thermoplastic polymer and diluent vary with each combination. For UHMWPE polymers, an example of a thermosensitive polymer, the melt blend preferably includes from about 2 parts to about 50 parts of polymer and from about 98 parts to about 50 parts by weight of diluent.

Figure 2:
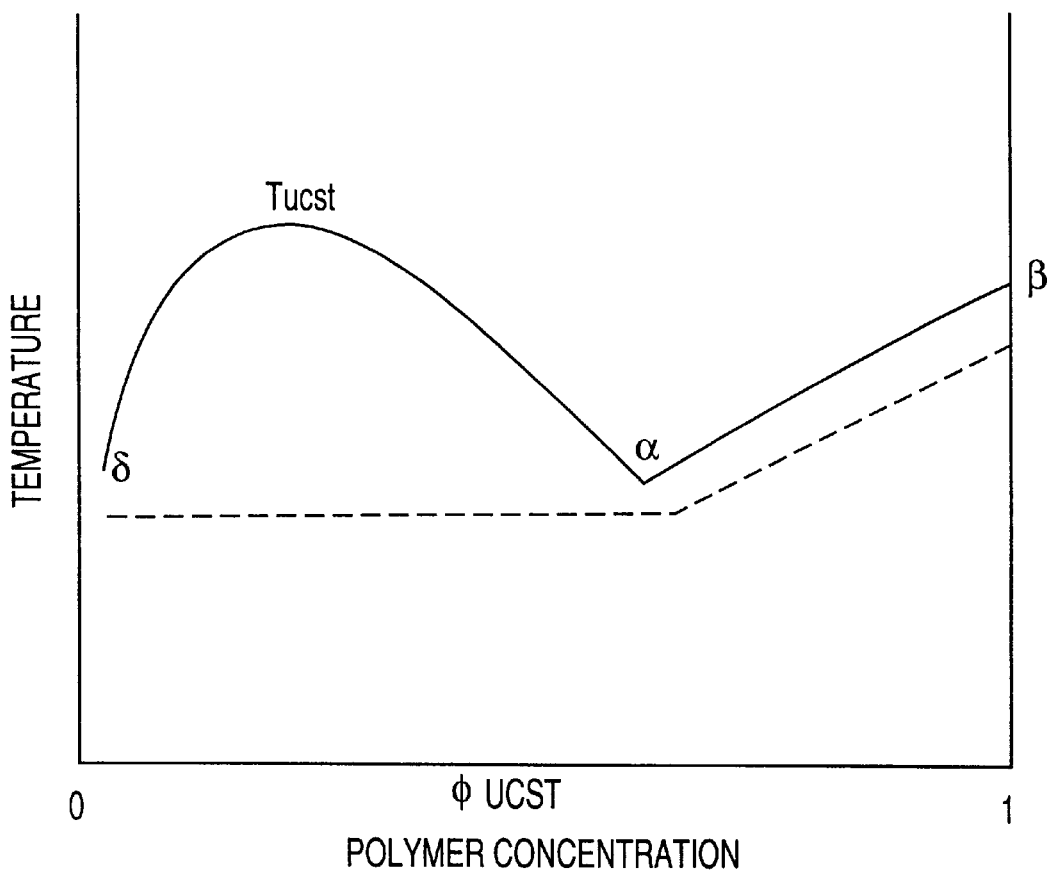
FIG. 2 is a temperature-composition plot for a thermoplastic polymer/diluent system used in the TIPT process. The dashed line is a temperature-concentration plot for a constant rate of cooling.

For crystalline polymers the polymer concentration that can be used for a solid-liquid or liquid—liquid phase separation in a given system can be determined by reference to the temperature-composition graph for a polymer-liquid system, an example of which is set forth in FIG. 2. Such graphs can be readily developed as described in Smolders, van Aartsen and Steenbergen, Kolloid-Zu Z. Polymere, 243:14–20 (1971). Phase transitions can be located by determining the cloud point for a series of compositions at a sufficiently slow rate of cooling that the system stays near equilibrium. Referring to FIG. 2, the portion of the curve from gamma to alpha represents the thermodynamic equilibrium liquid—liquid phase separation. $T_{ucst}$ represents the upper critical temperature of the systems. The portion of the curve from alpha to beta represents the equilibrium liquid-solid phase separation. The diluent can be chosen such that the crystallizable polymer and diluent system exhibits liquid-solid phase separation or liquid—liquid phase separation over the entire composition range.

$\Phi_{ucst}$ represents the critical composition. To form the desired porous polymers, the polymer concentration utilized for a particular system preferably is greater than $\Phi_{ucst}$. If the polymer concentration is below the critical concentration ($\Phi_{ucst}$), the phase separation, upon cooling, generally forms a continuous phase of diluent with dispersed or weakly associated polymer particles and the resulting polymer composition typically lacks sufficient strength to be useful.

For a given cooling rate, the temperature-concentration curve of the diluent-polymer blend can be determined by Differential Scanning Calorimetry (DSC), for example, as indicated by the dashed line of FIG. 2 for one rate of cooling. The resulting plot of polymer concentration versus melting temperature shows the concentration ranges that result in solid-liquid and in liquid—liquid phase separation. From this curve, the concentration ranges for the polymer and the liquid that yield the desired porous structure at the given cooling rate can be estimated. The determination of the melting temperature-concentration curve DSC is an alternative to determination of the equilibrium temperature-composition curve for a crystalline polymer.

The above discussion of phase diagrams is applicable to amorphous polymers except that only liquid—liquid phase separations occur. In this case, a cloud point generally is indicative of the particular phase transition. Similarly, for gel forming polymers the phase transition of relevance involves a transition from a homogeneous solution to a gel. In the case of gel forming polymers, an abrupt increase in viscosity is indicative of a phase transition from the melt to the gel, although a cloud point may also be observed in some cases.

For many liquid-polymer systems, when the rate of cooling of the liquid-polymer solution is slow, liquid—liquid phase separation occurs at substantially the same time as the formation of a plurality of liquid droplets of substantially uniform size. When the cooling rate is slow enough such that the droplets form, the resultant porous polymer has a cellular microstructure. In contrast, if the rate of cooling of the liquid-polymer solution is rapid, the solution undergoes a spontaneous transformation called spinodal decomposition, and the resultant porous polymer has a fine, open-cellular structure with a qualitatively different morphology and physical properties than obtained following droplet formation. The fine porous structure is referred to as a lacy structure.

In the case of ultrahigh molecular weight polyethylene (UHMWPE), the article obtained upon cooling may exist in a gel state. The nature of the underlying polymer network following cooling is affected by the rate of cooling. Fast cooling tends to promote mostly gel formation while slow cooling tends to allow more crystallization to occur. Gel formation tends to dominate for diluent/UHMWPE weight ratios greater than about 80:20, whereas crystallization dominates increasingly for diluent/UHMWPE weight ratios less than about 80:0. The polymer network in the case of highly particle filled UHMWPE as determined by SEM after extraction of the diluent tends to be a fairly dense structure having fine pores. The structure of the network can be changed by the extraction process. The highly particle filled UHMWPE films produced by the TIPT process are porous after extraction without the need for restraint during either extraction or stretching.

When liquid-solid phase separation occurs, the material has an internal structure characterized by a multiplicity of spaced, randomly disposed, non-uniform shaped, particles of polymer. Adjacent particles throughout the material are separated from one another to provide the material with a network of interconnected micropores and being connected to each other by a plurality of fibrils consisting of the polymer. The fibrils elongate upon orientation providing greater spacing between the polymer particles and increased porosity. Again, the filled particles reside in or are attached to the thermoplastic polymer of the formed structure.

If desired, the polymer can be blended with certain additives that are soluble or dispersable in the polymer. The quantity of these additives should be low enough that the additives do not interfere with the formation of the porous material. When used, the additives are generally less than about 10 percent by weight of the polymer component and preferably less than about 2 percent by weight. Typical additives include, for example, antioxidants and viscosity modifiers.

The melt blend further includes particulates for incorporation into the electrodes for all of these highly-filled compositions regardless )of the type of phase transition involved, porous films can be obtained by extraction of the diluent without physical restraint during either extraction or stretching of the film. In some cases, however, restraint of the film during extraction may result in larger bubble points and smaller Gurley values than for the same film extracted without restraint. The particulates can be a mixture of materials. For the production of electrodes, the particulates include redox active materials and/or conductive particles. The particles preferably form a dispersion in the diluent and are insoluble in the melt blend of polymer and diluent. The appropriate types of materials have been described above, as long as the materials are appropriately compatible with the polymer and diluent.

Some of these particles, especially small sized carbon particles, serve as a nucleating agent. The nucleating agent can be a solid or a gel at the crystallization temperature of the polymer. A wide variety of solid materials can be used as nucleating agents, depending on their size, crystal form, and other physical parameters. Smaller solid particles, e.g., in the submicron range, tend to function better as nucleating agents. Preferably, nucleating agents range in size from about 0.01 microns to about 0.1 microns aid more preferably from about 0.01 microns to about 0.05 microns. Certain polymers such as polypropylene perform better in the TIPT process with a nucleating agent present.

In the presence of a nucleating agent, the number of sites at which crystallization s initiated increases relative to the number in the absence of the nucleating agent. The resultant polymer particles have a reduced size. Moreover, the number of fibrils connecting the polymer particles per unit volume is increased. The tensile strength of the material is increased relative to porous films made without the nucleating agent.

In the porous structures, preferably the particles are uniformly distributed in the polymer matrix, and are firmly held in the polymeric structure such that they do not wash out on subsequent extraction of the diluent using solvent. The average particle spacing depends on the volume loading of the particles in the polymer, and preferably is such that, in the case of conductive particles, the particles are in sufficiently close proximity to sustain electrical conductivity. Processing of particles in the polymer matrix, particularly conductive-carbon particles, requires care, since undermixing can result in poor dispersion, characterized by lumps of particles, and overmixing can cause the agglomerates to disperse completely in the polymer. Conductive particle proximity is important for high levels of conductivity. Therefore, both extremes of mixing are unfavorable for the conduction properties of the mixture.

The melt blend can contain as high as about 40 percent to about 50 percent by volume dispersed particles. By combining high diluent concentrations with high volume percent of particles, a high weight percent of particles can be achieved after the diluent has been extracted from the phase separated polymer composition. Preferably, the extracted and dried polymer material includes from about 50 percent to about 98 percent particles and more preferably from about 70 percent to about 98 percent by weight particles and even more preferably from about 90 percent to about 98 percent by weight particles.

The diluent eventually is removed from the material to yield a particle-filled, substantially liquid-free, porous polymeric material. The diluent may be removed by, for example, solvent extraction sublimation, volatilization, or any other convenient method. Following removal of the diluent, the particle phase preferably remains entrapped to a level of at least about 90 percent, more preferably 95 percent and most preferably 99 percent, in the porous structure. In other words, few of the particulates are removed when the diluent is eliminated, as evidenced for example by lack of particulates in the solvent washing vessel.

A particular approach for implementing the TIPT process is described. Variations on the described approach can be made based on the teachings herein. In the first step of one embodiment the TIPT process, the particles are disposed beneath the surface of the diluent, and entrapped air is removed from the mixture. A standard high speed shear mixer operating at several hundred RPM to several thousand RPM for about several minutes to about 60 minutes can be used to facilitate this step. Appropriate high speed shear mixers are made, for example, by Premier Mill Corp., Reading, Pennsylvania and by Shar Inc., Fort Wayne, Ind.

If more dispersion is needed following the first mixing step, it can be achieves through milling of the dispersion before pumping the dispersion into the extruder, or through introduction of dispersing elements into the extruder. For shear sensitive polymers such as UHMWPE, most particulate dispersion preferably is done prior to pumping the dispersion into the extruder to minimize the shear needed in the extruder. Alternatively, the dispersion of particulates into the diluent can be done in the first zone of an extruder to disperse the particulate and the UHMWPE added in a later zone to avoid applying excessive shear to the UHMWPE.

The degree of preferred dispersion can be determined by inspection of the final electrode film, by determination of its conductivity and by evaluation in a half-cell. The surface should be generally smooth and uniform with no protrusions through the surface large enough to be seen by eye. Insufficient dispersion of particulates can result in films having rough surfaces with a texture of fine to course sandpaper. In certain instances, no milling is needed since the shear used simply to wet out the particulates results in sufficient dispersion. Appropriate selection of components such as the diluent and the initial particles can greatly facilitate the dispersing step.

When additional dispersion is required or desired, the diluent containing the particulate material can be processed in a mill. Useful mills include, for example, attritors, horizontal bead mills and sand mills. Typically, a single pass through a horizontal bead mill at a moderate through-put rate (i.e., moderate relative to the maximum through-put rate of the mill) is sufficient. When significant amounts of dispersion are required, milling times for recirculation of dispersion through the mill of less than an hour may be sufficient in some cases, while milling times of at least about 4 to about 8 hours may be needed in other cases.

Preferably, particle/diluent milling is carried out at relatively high viscosity where the milling process is more effective. An example of an appropriate instrument for processing small batches is an attritor Model 6TSG-1-4, manufactured by Igarachi Kikai Seizo co. Ltd., Tokyo, Japan. This attritor has a water-cooled jacket with about a 1 liter volume which operates at about 1500 RPM with a capacity to process about 500 cc of material.

For larger batches, appropriate instrument include, for example, a 0.5 gallon vertical sand mill manufactured by Schold Machine Co., St. Petersburg, Fla. and a horizontal bead mill from Premier Mill. This bead mill can use up to about 1300 cc of 1.3 mm stainless steel balls as milling media and operates at peripheral speeds of from about 300 to about 3300 ft/min. The material is fed continuously using a gear pump to provide a processing rate of about 0.25 to 10 gallons per hour.

Milling reduces agglomerates to smaller agglomerates or primary particles but generally does not break down primary particles to smaller particles. Filtration can be used if a greater number of larger particles are present than desired. Appropriate filters include, for example, model C3B4U 3 micron rope wound filter made by Brunswick Technitics (Timonium, Md.) to remove agglomerated particles or particles larger than about 3 microns. Filtering results in a more uniform article and allows metering of the dispersions under pressure by close tolerance gear pumps during extrusion process without frequent breakdowns due to large particles clogging the pump.

A dispersant can be added to the mixture of diluent and particles to aid in stabilizing the dispersion of particles in the diluent and and in maintaining the particles as unaggregated. If a dispersant is used, the diluent-particle mixture preferably contains from about 1 percent to about 100 percent by weight of dispersant relative to the weight of the particles. The concentration of particles can be determined, for example, using a Model DMA-4S Mettler/Paar densitymeter manufactured by Nettler-Toledo, Inc., Hightstown, N.J. The appropriate amount of dispersant is determined by type of particles and the diluent.

Anionic, cationic and nonionic dispersants can be used. In diluents like mineral oil, examples of useful dispersants include OLOA 1200, a succinimide lubricating oil additive, available from Chevron Chemical Co., Houston, Tex., and Hypermer™ LP1 and LP4 available from ICI Americas, Wilmington, Del. For electrodes containing electroactive carbon, a disperdant should be selected that does not foul the carbon as evidenced by loss of capacity upon cycling.

The diluent-particle mixture generally is heated to about 150° C. to degrees the mixture before pumping the mixture into an extruder. The mixture can be pumped into the extruder with or without cooling the mixture to ambient temperature. The polymer is fed typically into the feed zone of the extruder using a gravimetric or volumetric feeder. (In an alternative embodiment, at least some of the particles can be added with the polymer to the extruder.) For thermoplastic polymers, feed and melt zone temperatures preferably are selected so that the polymer is at least partially melted before contacting diluent. If the particles are easily dispersed the particles can be fed at a controlled rate into the extruder, and the diluent separately metered into the extruder. Also, a variety of in-line mixers are available that provide for dispersion of particulates on a continuous in-line basis from streams of particles and liquids.

Then, a melt blend is formed with the polymer in the extruder. Following sufficient mixing in the extruder, the melt blend is cast into the desired form. Typically, since a film is desired, the melt blend is extruded onto a temperature-controlled casting wheel using a drop die. A twin-screw extruder is preferred.

Following formation of the desired shape of material, the material is cooled, preferably rapidly, to induce the phase transition. Quench conditions depend on film thickness, extrusion rate, polymer composition, polymer-to-diluent ratio, and desired film properties. Preferred conditions for a specific film can be readily determined. For higher quench temperatures, film strength may be diminished relative to films formed at lower quench temperatures. Rapid cooling can be accomplished by, for example, cooling in sufficiently, cold air, cooling by contact on one or more sides with a temperature-controlled casting wheel or immersion of the material in a temperature-controlled liquid. Following quenching, the diluent is removed. If a solvent is used to remove the diluent, remaining solvent is removed by evaporation.

For a given polymer-diluent combination, use of a casting wheel can result in an asymmetric film. As the casting wheel temperature is lowered, it is increasingly likely that the resulting film sill be asymmetric. Typically, the side of the film toward the casting wheel has a "skin" that is denser and has smaller pores. Alternatively, a higher casting wheel temperature relative to the air temperature can result in a denser surface layer on the air side. In general, a lower casting wheel temperature produces a film that is stronger, denser on the casting wheel side, and has a small bubble point and higher Gurley value.

2. Polymer-Fibrillation (PF) Process

The second preferred process for the formation of porous electrodes involves the preparation of a mixture of a fibril-forming polymer, a lubricant and insoluble nonswellable particles. Non-swellable particles preferably swell by less than 50 percent. Following formation of a sheet and removal of the lubricant, a porous composite article remains. The method provides for controlling porosity and mean pore size. The particles are approximately evenly distributed in the composite and are enmeshed in the fibril forming polymer. This process is adapted from the processes outlined in U.S. Pat. Nos. 4,153,661, 4,460,642, 5,071,610 5,113,860 and 5,147,539, incorporated herein by references Preferred polymers include halogenated vinyl polymers such as polytetrafluoroethylene (PTFE). Dry powder PTFE such as Teflon™ 6C can be used as the starting material. Alternatively, the process can be preformed using a commercially-available aqueous dispersion of PTFE particles, such as Teflon 30™, Teflon 30b™, and Teflon 42™ (E.I. DuPont de Nemours Chemical Corp., Wilmington, Del.), wherein water acts as a lubricant for subsequent processing. The milky-white aqueous suspensions can have minute PTFE particles ranging in size from about 0.05 micrometers to about 1.5 micrometers. The PTFE dispersions generally contain solids from about 30 percent by weight to about 70 percent with the major portion of the solids being PTFE particles.

Commercially available PTFE aqueous dispersions may contain other ingredients such as surfactants and stabilizers, which promote continued suspension of the PTFE particles. In some applications, it is advantageous to remove the surfactant, if present, by extraction at a desired point in the process.

The lubricant must be selected such that the polymer is not soluble in the lubricant. Preferred lubricants include water, organic solvents and mixtures of water and miscible organic solvents that can be conveniently removed by washing or drying. The organic solvents include, for example, alcohols, ketones, esters and ethers. Alcohols are especially preferred because of their efficacious removability after fabrication of the article by solvent extraction or drying. Water-alcohol mixtures can be formed in any proportion, preferably in a ratio from about 4:1 to about 1:4, and more preferably in a ratio of roughly about 1:1. Preferred alcohols include $C_1$ to $C_5$ alkanols. Other preferred lubricants include, for example, perfluorinated compounds such as Fluorinert (3M, Saint Paul, Minn.) or other similar compositions. Perfluorinated is used to indicate that substantially all of the hydrogen atoms have been replaced by fluorine atoms. Alternative perfluorinated liquids include Galden® and Forblin® perfluorinated fluids (Ausimont U.S.A., Thorofare, N.J.; Ausimont S.p.A., Montedison Group, Milan, Italy).

Preferred particles have a solubility of less than about 1.0 grams in 100 grams of lubricant at the mixing temperature. The particles can be but do not need to be absorbent or adsorbent with respect to the lubricant. The absorptive or adsorptive capability of the particles with respect to lubricant preferably is less than about 10 percent by weight and more preferably less than 1 percent. The particles preferably have an average diameter less than about 200 microns, more preferably in the range from about 1.0 microns to about 100.0 microns and more preferably in the range from about 1.0 microns to about 40 microns. Due to the wetting properties of certain particles including certain carbon particles, non-aqueous, organic lubricants are preferred when these particles are used in large quantities.

The particles can include a mixture of compositions. The particles generally include the redox active materials and the conductive materials that are added to create the functional properties of the electrode. Appropriate redox active and conductive materials are described above, as long as the particles are insoluble and nonswellable.

In addition to the redox active and/or conductive particles, the mixture can include non-swellable property modifiers, which can be soluble in water. Representative non-swellable property modifier, include coated particles, ion exchange particles, calcium carbonate, ammonium carbonate, kaolin, sugar, polyethylene, polypropylene, polyester, polyamine, polyurethane, polycarbonate, zeolites, chitin, vermiculite, clay, ceramics, chelating particles and the like. Optional, non-swellable property modifiers can be present in amounts ranging from about 0 to about 10 percent by weight of the total mixture and preferably from about 0.1 to about 1.0 percent by weight.

In addition, the mixtures can include water-swellable property modifiers, preferably less than about 25 percent by weight of particulates and more preferable less than about 10 percent and even more preferably less than about 1 percent by weight of particulates. Representative swellable property modifiers include starch, chitosan, modified starches such as Sephadex™ and Sepharose™ (Pharmacia, Sweden), agarose, polymethacrylates, styrene divinylbenzene copolymers, polyacrylamides, cellulose fibers, casein, zein, crosslinked hide glue, polyamicies optionally plasticized with glycerine and coated particles, e.g., silica coated with polyacrylamide.

Small amounts of other useful additives can be added such as charge transfer agents for overcharge protection and special function additives including, for example, lithium carbonate, which forms carbon dioxide on overcharge helping to activate the pressure vent of the battery.

The weight ratio of insoluble particles to polymer preferably is in the range from about 400:1 to about 4:1. The lubricant preferably is added in an amount exceeding the absorptive and absorptive capability of the particles by at least about 3 percent by weight and below an amount at which the polymer mass loses its integrity, more preferably by at least about 5 weight percent and less than about 200 percent, even more preferably by at least about 25 percent and less than about 200 percent and yet even more preferably by at least 40 percent and less than about 150 percent.

The absorptive capacity of the particles is exceeded when small amounts of water can no longer be incorporated into the putty-like mass without separation of lubricant. A large viscosity change takes place corresponding to a transition from a paste to a slurry. An amount of lubricant exceeding the absorptive capacity of the particles should be maintained throughout the entire mixing operation. The void volume and porosity are controlled by the amount of lubricant used.

The mean pore size of the final article generally is in the range from about 0.01 micrometers to about 10.0 micrometers, and more preferably from about 0.1 micrometers to about 1.0 micrometers. With respect to distribution of pore size, preferably at least about 90 percent of the pores have a size less than about 1 micrometers. The void volume as measured by Mercury Intrusion Porosity preferably ranges from about 10 percent to about 50 percent and more preferably from about 25 percent to about 35 percent.

Alternatively, porosity of the film can be quantified by the Gurley value of the film, that is, the amount of time needed for a given volume of gas to pass through a predetermined area of the film. The Gurley measurements are obtained following the procedure given in ASTM standard D 726-58 (1983) method A, using either 50 cc or 10 cc of gas. Typically, Gurley values for films of the invention range from about 2 seconds per 10 cc to about 100 seconds per 10 cc. Preferably, films show a Gurley value of less than about 50 seconds per 10 cc and more preferably less than about 40 seconds per 10 cc.

Increasing the amount of lubricant increases void volume and mean pore size. The void volume and mean pore size vary according to the amount of lubricant present during the fibrillation process, all other variables remaining constant including the amounts of polymer, particle type and size, mixing time, temperature and other processing parameters. The other variables can affect porosity but do not have the precise controlling effect provided by the lubricant amount. Control of all these variables provides for a high level of reproducibility of the resulting porous electrode.

To practice the PF process, the materials are blended together to form a soft dough-like mixture. If a solid powdered polymer is used a low surface energy solvent can be used to disperse the polymer into the mix. The blend is mixed at a temperature and for a time sufficient to cause initial fibrillation of the polymer particles. The mixing temperature is selected to maintain the solvent in liquid form. When using aqueous lubricants, the temperature preferably is in the range from about 0° C. to about 90° C. and more preferably from about 20° C. to about 60° C.

Initial fibrillation can take place simultaneously with the initial mixing of the ingredients. If additional mixing is needed, mixing times generally range from about 0.2 minutes to about 2 minutes to obtain initial fibrillation of the fibril forming polymer. Initial fibrillation generally is optimum within about 90 seconds after the point when all components have been fully incorporated together into a putty-like consistency. Mixing for shorter or longer times may produce a composite sheet with inferior properties. Preferably, mixing is ended after going through or reaching a viscosity maximum. This initial mixing causes partial disoriented fibrillation of the fibril forming polymer particles.

Devices useful for obtaining intensive mixing include commercially available mixing devices that sometimes are referred to as internal mixers, kneading mixers, double-blade batch mixers, intensive mixers and twin screw extruder compounding mixers. The most popular mixers of this type include sigma-blade mixers and sigma-arm mixers. Commercially available mixers of this type include those sold under the designations Barbury™ mixer (Farrel Corp., Ansonia, Conn.), Mogul™ mixer (Littheford Day Inc., Fluorence, Ky.), Brabender Prep™ mixer and Brabender™ sigma blade mixer (C.W. Brabender Instruments, Inc., South Hackensack, N.J.) and Ross™ mixers (Alling-Lander Co., Chesaire, Conn.).

Following mixing, the soft putty-like mass is transferred to a calendering device. The blend is subjected to repeated biaxial calendering between calendering rolls to cause additional fibrillation of the polymer. For typical lubricant/polymer combinations the calendering rolls preferably are maintained at a temperature less than about 125° C., more preferably at a temperature from about 0° C. to about 100° C. and even more preferably from about 20° C. to about 60° C. Lubricant lost to evaporation can be replaced between passes through the calender. For non-aqueous lubricants, the temperature can be adjusted according to the temperatures over which the lubricant is a liquid. During calendering, lubricant levels are maintained at least at a level exceeding the absorptive capacity of the solids by at least about 3 percent by weight, until sufficient fibrillation occurs to produce the desired void volume and porosity.

The calendering is repeated to form a self supporting tear resistant sheet. The gap between the calendering rolls generally is decreased with each successive pass. The material typically but not necessarily is folded and rotated 90° between passes through the calender. The number of passes through the calender, the number of folds and gap settings can be adjusted to yield the desired properties of the resultant sheet. As the calendering is repeated, the tensile strength reaches a maximum beyond which additional calendering becomes deleterious. Calendering generally is stopped after the maximum tensile strength is reached and before the tensile strength deteriorates below the minimum acceptable tensile strength. Generally, about 10 to about 20 passes through the calendering rolls are appropriate. Once a web of the desired thickness has been obtained, it can be air-dried at room temperature or placed in a convection oven at an appropriate temperature in order to remove excess inert fluid. Films preferably have a final thickness from about 0.1 mm to about 1.0 mm, more preferably about 0.2 mm to about 0.4 mm.

The resultant sheet preferably has a tensile strength of at least about 1 megapascals and more preferably at least about 3 megapascals. The sheets are substantially uniformly porous with particles generally uniformly distributed in a polymer fibril matrix. Almost all of the particles generally are separated from each other, yet the particles remain in sufficient proximity such that good electrical conductivity is obtained.

C. Separators

The separators include polymers and can be porous or solid. The separators can be made by similar processes used to produce the electrodes. The separators, in contrast with the electrodes, are electrochemically inert. In other words, the separators do not participate in the redox reactions within the battery. Part of the function of the separator is to keep apart the reactants taking part in the two half reactions to prevent short circuiting of the battery. The separators must provide for ion conduction and are electrically insulating.

Solid separators provide for transmission of ions so that a net flow of ions across the separator can take place. The flow of ions is necessary to the maintenance of electrical neutrality within the battery. The solid separators include ions of the electrolyte dispersed throughout the material to provide for the transmission in view of the incorporation of the ions in the material without the need for a liquid solvent.

The electrolyte can be Incorporated into the structure of the solid separator following formation of the separator or formation of the entire battery by swelling the solid separator with a liquid plasticizer containing dissolved electrolyte. The plasticizer can be removed later to leave behind ionic electrolyte within the polymer separator. Solid separators can also be called solid electrolytes, although this second term may have somewhat different scope.

Preferred separators are porous. Porous separators generally can provide greater ionic conduction with less resistance for a given voltage across the separator than solid separators. Porous separators do not necessarily have particles incorporated within the polymer. Preferred porous separators include particles within the polymer. The presence of particles within the structure provides for a broader range of effective lamination conditions without destroying porosity. Generally particle filled separators resist compression better than unfilled porous separators. Preferred particles are inert aid are not electrically conducting. Preferred particles include particles of, for example, silica, alumina, aluminum oxides, mica, clays, $CaSiO_x$, $AlSiO_x$ and glass. The separators preferably include from about 20 percent particles to about 98 percent by volume, and more preferably from about 40 percent by weight to about 70 percent by volume.

Separators need to provide for ionic conduction preferably such that ionic conduction is not a limiting step in current generation. Porous separators may have higher void volumes than porous polymer electrodes since they are not loaded with active materials. Porous separators preferably have a void volume from about 30 percent to about 80 percent and more preferably from about 50 percent to about 80 percent.

The porosity and void volumes of the separator are limited only by the requirement that the separator maintains a reasonable mechanical strength and sufficient structural integrity such that the electrodes remain sufficiently isolated and that no redox reactions occur without current production.

Separators preferably are thinner than the electrodes to minimize volume end to maximize ion transport. Preferred separators have a thickness from about 0.0005 inches to about 0.002 inches and more preferably from about 0.0005 inches to about 0.001 inches. The separator area generally is equal to or slightly greater than the electrodes, which are placed adjacent to the separator such that contact of the electrodes is prevented.

Porous separators can be produced using the two methods described above for the production of porous electrodes. The processes are appropriately adapted for the production of separators by not including conducting or reactive particles within the structures. Separators can be stretched to increase pore size.

D. Battery Construction

As noted above, the battery can include a variety of combinations of polymeric electrodes and separators preferably where at least one of the elements is porous. Preferred batteries have porous electrodes and porous separator.

The electrodes are placed on either side of the separator and are held together. The elements must be held closely together to reduce resistance and to provide sufficient current. The elements can be held together by a physical barrier exerting force around the outside of the elements. This physical barrier can be a container, a polymer coating or the like.

Preferably, the elements are held together by lamination. Lamination supplies the physical proximity that provides for useful currents through a battery with a reasonable size. Lamination is preferred over the alternatives using a physical barrier because the resistance is reduced and current correspondingly is increased. Surprisingly, the lamination step can be performed with porous polymer components without destroying the porous characteristic or structural integrity of the elements. When lamination is used with porous separator elements, the separator preferably includes a filler.

The lamination step should form cohesive association between the different polymer components. Selection of appropriate conditions for the lamination is based on the specific materials used. Particular examples are described below.

The objective is to eliminate or, at least, reduce the physical interface between the layers. Cohesion or self-adhesion of polymers can be promoted by increasing the total area of contact and through diffusional interlacing of polymer chains at the areas of contact. The lamination processes either increase the physical interface, the diffusional interlacing or both. Some preferred polymer components described above are more compressible than typical polymer films. Increased compressibility makes pressure more effective in increasing contact area.

In addition to securing the separator to the two electrodes, at least one current collector preferably is attached to each electrode. The current collector provides for connection of each electrode of the battery to external connections. The current collector generally is made from a conductive metal. The current collector can have a variety of shapes, where a preferred shape may depend on the method of attaching the current collector to the electrode.

Figure 3:
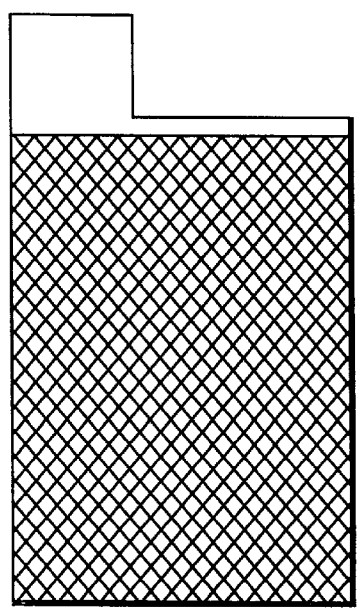
FIG. 3 is a front view of a current collector with a metal grid.

For example, as depicted in FIG. 1, current collectors 108, 110 can be a thin metal foil with an extension 112, 114 for attachment of the battery to external connections. The surface of the foil can be roughened to enhance adhesion. Alternatively, the current collector can be a metal grid, for example, as depicted in FIG. 3. The metal grid can penetrate the surface of the electrode to secure the current collector to the electrode. The foil sheet or grid can be laminated to the electrode either before, simultaneously or after lamination of the electrode to the separator. The foil or grid can extend over the entire electrode or only over a portion of the electrode.

Furthermore, the current collector can be completely integrated into the polymer electrode. For example, the current collector can be sandwiched between two sheets of polymer electrode. Alternatively, to produce an integrated current collector within an electrode, the current collector can be placed within the polymeric composition as the electrode is being formed. For example, if the electrodes are produced by the TIPT process, the material can be extruded onto the current collector, preferably a grid. Alternatively, the current collector can be laminated to the electrode by passing a current collector and at least one electrode film through a set of nip rollers or the like preferably before extracting the diluent. Preferably, relatively low pressures and moderate temperatures (preferably from about 25° C. to about 170° C.) are used to form the laminate.

The lamination of the electrodes to the separator can be accomplished in a variety of ways. These approaches include the use of heat lamination, pressure lamination, solvent lamination, adhesive lamination or co-extrusion. Heat lamination, solvent lamination and adhesive lamination can involve some addition of pressure. The appropriate methods for lamination depend on the materials. For TIPT components, films can be solvent laminated by maintaining the films in intimate contact with each other during removal of the diluent in the films, for example, as taught in U.S. Pat. No. 4,863,792, incorporated herein by reference. The effectiveness of the solvent for lamination depends on the degree that the solvent swells he polymer, with improved lamination corresponding with increased swelling.

The use of adhesives is generally only appropriate for the lamination of the current collector to the electrode. Adhesives can interfere with the flow of ions if they are used to laminate the electrodes to the separator. Preferred adhesives include polyethylene latexes containing conductive carbon.

In addition, two or all three of the polymer components can be coextruded with or without current collectors. This coextrusion of the polymers would be preferably done when the materials are being formed by the TIPT process. To complete the TIPT process, the coextruded structure would then be cooled quickly to induce the phase transition, as described above.

The preferred lamination techniques for the different preferred materials used to construct the battery are summarized in the Tables below. These are preferred approaches and other combination may be possible while achieving successful results.

TABLE 1

| ELECTRODE | CURRENT COLLECTOR |
| --- | --- |
| PF | P, A |
| TIPT | H, A, E, P |

TABLE 2

| | | SEPARATOR | |
| --- | --- | --- | --- |
| ELECTRODE | TIPT | TIPT (Filled) | PF |
| PF | P | H, P | P |
| TIPT | S, CE | H, S, CE, P | P |

Legend for Tables 1 and 2
H=Heat
P=Pressure
S=Solvent
A=Adhesive
E=Extrude
CE=Co-Extrude E. Additional Processing The demand exists for batteries for commercial use with ever increasing performance capabilithes. Therefore, the performance characteristics preferably are optimized. While the materials described above have good porosity with respect to ion flow, it has been discovered that additional processing improves these characteristics further.

First, the polymer electrode can be heated near or above the melting point of the polymer. Surprisingly, this does not destroy the porosity. Instead, it is found that the pore size increases, the Gurley Time decreases and resistivity decreases. These changes increase with temperature until a maximum is reach generally at or above the melting point of the polymer. Use of higher temperatures above this maximum only embrittles the electrode. Similar processing can be performed on separators such as silica filled polymer separators.

The best results are generally obtained from about 20 degrees centigrade above to about 20 degrees centigrade below the melting point of the polymer. Preferably, the heating is performed for a period of time to heat the polymer electrode up to the target temperature and for polymer flow to occur. For laboratory evaluation, a period of about 10 minutes is sufficient to ensure that the film has equilibrated at the temperature of the oven and for polymer flow to occur. This period of time accommodates the inevitable loss of heat from an oven due to opening and the time required for the oven to equilibrate at its set point. For continuous in-line processing much shorter residence times may be sufficient for heating the film to the target temperature and for polymer flow to occur.

In addition, the polymer electrodes can be calendered by passing the electrode through rollers under sufficient pressure to decrease the void volume of the electrode. Calendering decreases the void volume, which results in an increase in the volumetric energy efficiency of the battery and an increase in conductivity. Calendering can also decrease brittleness that can result from heating the polymer film.

Preferably, the electrodes are treated with both heat and calendering. For TIPT electrodes the heating and calendering preferably is done after the diluent is removed. The calendering is preferably done to the electrode after the heating. Alternatively, the calendering can be done prior to or simultaneously with the heating step.

Alternatively, the heat treatment and/or calendering can be performed on the battery construction following lamination. The processing of the battery construction preferably does not significantly reduce the void volume of the separator. When this processing is performed on the battery construction, the separator element preferably includes particles (i.e., filler), which impart compression resistance to the separator and prevents loss of porosity. Again, the heat treatment is preferably done prior to calendering, although the calendering can be performed prior to or simultaneously with the heat treatment.

F. Activation and Use

The final product is infused with electrolyte to provide for ionic flow within the battery during use. The electrolyte can be introduced at various points in the production process. The electrolyte can be present when the lamination step is performed. In this way, a functioning battery is formed following the lamination process.

Alternatively, the lamination can be performed without any electrolyte present. The resulting structure has a long shelf life since no ionic flow is possible to encourage chemical reactions within the electrodes. Then, the electrolyte is added to the finished battery when ready for activation. If the electrode are solid but the separator is porous, the electrolyte preferably is sufficiently flowable such that the electrolyte flows through the pores of the separator to infuse the entire region between the electrodes and the separator.

EXAMPLES

Gurley Value Measurements

Gurley value is a measure of resistance to air flow through a film. Gurley values were evaluated according to ASTM protocol D726-58 (1983, reapproved 1971), Method A (using a suitable gasket as specified in §4.2), except that either 50 cc or 10 cc of air was used. Specifically, this is a measurement of the time in seconds for the volume of air to pass through an area of film at a pressure of 124 mm of water. In evaluating the Gurley values, the air flow is evaluated through a 6.4 cm$^2$ (1.0 in$^2$) area of film. The film is clamped between two plate. Then, a cylinder is released that provides air to the sample at the specified pressure. The time for a given amount of air flow is read electronically using marks on the cylinder.

Bubble Point Measurement

Bubble point is the largest passageway in the film as determined according to ASTM F-316-80. Ethanol was used as the test liquid. The liquid is used to fill the pores of the film. Pressure is applied until flow as bubbles takes place through the largest passageway through the film. The bubbles are observed from a tube that is connected to the low pressure side of the test cell and that is submerged in water. The necessary pressure depends on the surface tension of the test liquid and the largest size of the passageway. Bubble point in microns, using ethanol as the test liquid, is equal to 9.25/pressure in psi at breakthrough.

Resistivity

With respect to Examples 1–8, in-plane electrical resistance was measured using two 1.5 cm wide aluminum bars that are placed parallel to each other on the surface of the film. Weights were placed on top of the bars to give a pressure of 300 g/cm². The results were generally pressure dependent. The resistance between the two aluminum bars was measured using a standard ohm meter. The resistivity in ohm-cm was calculated using the following equation:

resistivity=(in-plane resistance x width of the film x film thickness)/distance between bars Example 1

High Density Polyethylene Cathode—TIPT Process

A dispersion was prepared by wetting out 7095 g of $LiCoO_2$ (FMC, Bessemer City, N.C.) followed by 789 g of VXC72 conductive carbon (Cabot Corp., Billesica, Mass.) into a mixture of 2487 g of mineral oil (Superla® White Mineral Oil No. 31, Amoco Oil Co., Chicago, Ill.) and 789 g of dispersant, OLOA 1200, a succinimide lubricating oil additive (Chevron, San Francisco, Calif.), using a dispersator. A dispersator is a high shear mixing device having a flat disc with perpendicular saw tooth projections on its edge. The resulting mixture was passed through a 1.5 L horizontal mill from Premier Mill containing an 80 volume percent charge of 1.3 mm chrome-steel beads. The mill was operated at a peripheral speed of L800 fpm at a throughput rate of about 0.5 L/min. The density of the resultant dispersion was 1.8960 g/cc.

The dispersion was diluted with mineral oil in an iterative fashion until the density was 1.7707 g/cc (25° C.). This dispersion then was heated to 150° C. while mixing with the dispersator and held at 150° C. for about 20 min. to degrees it. It was then cooled to about 35° C. before transferring to the feed tank of the extruder.

The dispersion was pumped into an injection port on the third zone of a Berstorff co-rotating twin screw extruder (25 mm×825 mm). High density polyethylene, HDPE, (grade GM 9255 from Fina) was metered into the feed zone (first zone) at a rate of 1.35 lb./hr., and the above dispersion was pumped at a nominal rate of 95.0 cc/min. using a gear pump. The extruder profile starting from the feed zone was 380, 490, 490, 400, 330, 320, 330° F., the die temperature was 330° F., and the screw speed was 120 rpm. Film was extruded through an 8 in. die onto a smooth casting wheel heated to 32° C.

The resultant film was 0.0122 inches thick and the experimentally determined total film throughput rate was 22.7 lb./hr. Thus, the actual dispersion feed rate was 21.4 lb./hr. From this and the dispersion density, the total particulate content in the film after extraction of the oil was calculated to be 91.1 wt. percent.

The oil was extracted from the film using three, 10 min. washes with toluene. About 1 L of toluene per wash was used or a piece of film that was about 7" wide by 12" long. The film was then hung in an exhaust hood to dry. The thickness after drying was about 0.0119 inches. A piece of this film was further processed by hanging the film in a circulating air oven for 10 min. at 130° C. Measurements on the prepared film with and without further processing in the oven are shown in the table below. Heating the film to about the HDPE melting point of about 126° C. (peak temperature by DSC) resulted in a significant decrease in Gurley and significant increase in bubble point. Surprisingly, the linear shrinkage was only 6.7 percent.

TABLE 3

|  | After Washing/Drying, Before Heating | After Heating for 10 min. at 130° C. |
| --- | --- | --- |
| Caliper | 11.9 | 11.1 |
| Gurley (sec./50 cc) | 421 | 175 |
| Bubble Point (microns) | 0.18 | 0.32 |
| Percent Shrinkage (length) | — | 6.7 |
| Resistivity (ohm-cm) | 205 | 6.1 |

Example 2

Ultra High Molecular Weight Polyethylene Cathode—TIPT Process.

The following mixture was prepared using a Haake Rheocord System 40™ equipped with roller blades. Mineral oil (Superla® White Mineral Oil No. 31), 29.3 g, was added to the mixing chamber (the shafts were wrapped with Teflon® tape to prevent leakage). Then, while mixing at 50 rpm, 53.2 g of a mixture of 90 percent by weight $LiCoO_2$ (FMC) and 10 percent by weight VXC72 conductive carbon (Cabot) was added. During the addition of this mixture of powders, the temperature of the mixer was being raised from ambient temperature to 150° C.

Following addition of the $LiCoO_2$ and conductive carbon, 1.34 g of ultra high molecular weight polyethylene, UHMWPE, (grade GUR 4132 from Hoechst-Celanese, Houston, Tex.) was added. The mixer was then closed, and the mixing speed was increased to 100 rpm. The mixing was continued for 15 min. from the time that the UHMWPE was added. The molten mixture was then removed from the mixer.

A portion of the solidified mixture was placed between two sheets of 7 mil polyester film and then between two aluminum plates. The aluminun plates surrounding the polymers were placed in a Carver platen hydraulic press (Model 2518, Fred S. Carver Corp., Wabash, Ind.) at 150° C. Shims of 10 mil thickness were placed between the polyester film to limit closing of the press. The press was closed gradually over a 6 min. period to allow the polymer to re-dissolve in the oil before fully closing the press. The press was then closed using 100 psi and then opened after about 10 sec. The resultant pressed film with the polyester cover sheets still attached was immersed into a pail of water at ambient temperature, about 20° C., to quench the film.

The polyester film was peeled away and water on the electrode was wiped off. The oil was extracted as described in Example 1. The resultant film after extraction of the oil was 0.011 inches thick.

Example 3

Polypropylene Cathode—TIPT Process

The following mixture was prepared using a Haake Rheocord System 9000 equipped with roller blades. A 59.4 g quantity of a dry blend of about 90 percent by weight LiCoO$_2$ (FMC) and about 10 percent by weight VXC72 conductive carbon (Cabot), and 31.0 g mineral oil Superla® White Mineral Oil No. 31), were added alternately to the mixing chamber while mixing at 50 rpm initially and increasing the rpm gradually as the mixture became more viscous. Then, 7.72 g of polypropylene, PP, (grade DS D45 from Shell, Houston, Tex.) was added. Heating was commenced and the mixture was heated to 230° C. while mixing at 100 rpm. Mixing was continued until it was evident that steady torque had been reached, 31 min. after addition of the PP. The mixture was removed from the mixer while still hot.

A 21.4 g portion of the cooled mixture was placed between two sheets of 7 mil polyester film that had been coated with a light coating of mineral oil to facilitate removal of the mixture from the film after pressing. The mixture and polyester sheets were placed directly into a Carver press with 10 mil shims between the polyester film to limit closure of the press. The mixture was heated for 3 min. with no applied pressure and then the press was closed using 50 psi for 5 sec. followed by opening of the press and quenching of the resultant film by immersion of it with the polyester film still attached into water at ambient temperature.

The polyester film was peeled off, water wiped away, and the oil was extracted using toluene as described in Example 1. The film was about 0.008 inches thick after extraction of the oil.

Example 4

Polyvinylidene Fluoride Cathode—TIPT Process

A 6.22 g portion of VXC72 conductive carbon first was mixed into 94.8 g PC using a dispersator to increase the viscosity of propylene carbonate (PC). Then, 33.7 g of this mixture (2.11 g of VXC72 conductive carbon and 31.6 g of PC) were transferred into the mixing chamber of a Haake Rheocord System 40™ equipped with roller blades. After placing the mixture into the mixing chamber, 79.8 g of LiCoO$_2$ were added followed by addition of 7.89 g of polyvinylidene fluoride, PVDF (grade Solef 1010 from Solvay, Houston, Tex.) while mixing at 50 rpm at room temperature. Next, the mixing speed was increased to 100 rpm and heating to 180° C. was commenced. While heating, an additional 1.88 9 of VXC72 conductive carbon was added. The mixture was removed 15 min. after heating was started, while still hot.

A portion of the film was placed between two sheets of polyimide film and placed into a Carver press at 150° C. using 10 mil shims between the polyimide film. After heating for 3 min., the press was closed using 100 psi for 5 sec. The resultant film with polyimide film still attached was immersed into ambient temperature, deionized water to quench it. The top sheet of polymide film was removed easily. The pressed film was removed from the bottom polyimide film using a razor blade. The PC was extracted from the film as in Example 1 except that isopropyl alcohol was used instead of toluene. After drying, the film was 0.011 inches thick.

As shown in the table below, heating the film at 180° C., which is above the melting point of the PVDF (177° C.), resulted in a significant decrease in Gurley and significant increase in bubble point.

TABLE 4

| | After Washing/Drying, Before Heating | After Heating for 10 min. at 180° C. |
|---|---|---|
| Caliper | 10 | 10 |
| Gurley (sec./50 cc) | 101 | 23.5 |
| Bubble Point (microns) | 0.84 | — |
| Resistivity (ohm-cm) | 16 | 6.7 |

Example 5

High Density Polyethylene Anode—TIPT Process

The following mixture was prepared using a Haake Rheocord System 9000™ equipped with roller blades. Super S conductive carbon (M. M. M. Carbon, Brussels, Belgium), 1.46 g, was poured into the mixing chamber, which was at 100° C. Then, while mixing at 50 rpm, 58.1 g of a graphite/mineral oil mixture was poured into the mixing chamber. The graphite/mineral oil mixture was prepared by mixing 83.16 g of MCMB 6-28 graphite (Alumina Treading Co., Park Ridge, N.J.) into 94.26 g of mineral oil (Superla® White Mineral Oil No. 31) using a dispersator. As the viscosity increased during the addition of the graphite/mineral oil mixture to the mixing chamber, the mixing speed was increased to 100 rpm.

Then, 7.86 9 of HDPE (grace 1285 from Fina Oil and Chemical Co., LaPorte, Tex.) was added to the mixture. The mixture with the HDPE was heated to 230° C., which occurred over a period of about 10 min. Total mixing time after addition of the HDPE was about 36 min., which was the time required to ensure that a steady torque plateau had been reached. The resultant mixture was removed from the mixer while hot.

After cooling, 16.0 g of the solidified mixture was placed between 7 mil polyester sheets. The polyester sheets with the solidified mixture were placed in a Carver press at 160° C. with 10 mil shims placed between the polyester sheets. After heating in the press for 3 min. with no applied pressure, the mixture was pressed for 10 sec. using 50 psi. The resultant film with polyester sheets still attached was immersed into water at ambient temperature to quench it. The oil was extracted from the film using toluene as described in Example 1.

Example 6

Ultrahigh Molecular height Polyethylene Anode—TIPT Process.

First, a dry blend of MCMB 6-28 graphite, 27.89 g, and Super P (M. M. M. Carbon, Brussels, Belgium) conductive carbon, 1.47 g, was prepared using a spatula for mixing. Portions of this mixture and portions of mineral oil (Superla® White Mineral Oil No. 31), 37.1 g total, were added alternately to the mixing chamber of a Haake Rheocord System 9000 equipped with roller blades, which was at 40° C. During the addition of the materials, the mixing rate was 50 rpm.

Then, 1.55 g of ultrahigh molecular weight polyethylene, UHMWPE, (grade GUR 4132 from Hoechst Celanese) were added. After this addition was completed, the temperature of the chamber was increased to 150° C., and the mixing speed was increased to 80 pm. Mixing was continued for 10 min. after the addition of the UHMWPE had been completed. The mixture was removed from the mixer while still hot.

After cooling, 13.1 g of the solidified mixture was placed between 7 mil polyester sheets. The polyester sheets with the solidified mixture were placed in a Carver press at 160° C. with 10 mil shims placed between the polyester sheets. After heating in the press for 3 min. with no applied pressure, the mixture was pressed for 10 sec. using 50 psi. The resultant film with polyester sheets still attached was immersed into water at ambient temperature to quench it. The oil was extracted from the film using toluene as described in Example 1. Measurements of the properties of the film with and without additional heat processing are presented in Table 5.

TABLE 5

|  | After Washing/Drying, Before Heating | After Heating for 10 min. at 130° C. |
| --- | --- | --- |
| Caliper | 6 | 6 |
| Gurley (sec./50 cc) | 36.8 | 19.6 |
| Bubble Point (microns) | 0.60 | 0.93 |
| Resistivity (ohm-cm) | 36 | 9.7 |

Example 7

Polypropylene Anode—TIPT Process

Super S conductive carbon, 1.46 g, was poured into the mixing chamber of a Haake Rheocord System 9000 equipped with roller blades, which was at 100° C. Then, while mixing at 50 rpm, 59.7 g of a graphite/mineral oil mixture was poured into the mixing chamber. The graphite/mineral oil mixture was prepared by mixing 83.3 g of MCMB 6-28 graphite into 91.9 g of mineral oil (Superla® White Mineral Oil No. 31) using a dispersator. As the viscosity increased during the addition of the graphite/mineral oil mixture to the mixing chamber, the mixing rate was increased to 100 rpm.

Next, 7.66 g of polypropylene, PP (grade DS 5D45 from Shell) were added. After the addition of the PP, the mixture was heated to 230° C., which occurred over a period of about 10 min. Total mixing time after addition of the PP was about 33 min. The resultant mixture was removed from the mixer while hot.

After cooling, 14.2 g of the solidified mixture was placed between 7 mil polyester sheets, which had been coated with a thin coating of mineral oil to facilitate release. The polyester sheets with the solidified mixture were placed in a Carver press at 160° C. with 10 mil shims placed between the polyester sheets. After heating in the press for 3 min. with no applied pressure, the mixture was pressed for 10 sec. using 50 psi. The resultant film with polyester sheets still attached was immersed into water at ambient temperature to quench the film. The oil was extracted from the film using toluene as described in Example 1. Measurements on the film with and without additional heat processing are given in Table 6.

TABLE 6

|  | After Washing/Drying, Before Heating | After Heating for 10 min. at 180° C. |
| --- | --- | --- |
| Caliper | 8.2 | 8.0 |
| Gurley (sec./50 cc) | 32 | — |
| Bubble Point (microns) | 0.66 | — |
| Resistivity (ohm-cm) | 8.96 | 1.5 |

The film became brittle after heating at 180° C. for 10 min.

Example 8

Polyvinylidene Fluoride Anode—TIPT Process

A mixture of 91.37 g MCMB 6-28 graphite and 96.18 g propylene carbonate, PC, (Aldrich, Milwaukee, Wis.) was prepared by using a dispersator. A 65.8 9 portion of this mixture was transferred into the mixing chamber of a Haake Rheocord System 40™ equipped with roller blades, which was at 50° C. Then, while mixing at 50 rpm, 8.31 g of powdered polyvinylidene fluoride, PVDF (glade Solef 1010 from Solvay) were added. The temperature was increased to 180° C.

After increasing the temperature, an additional 4.16 g of PVDF followed by 1.60 g of super P conductive carbon were added. Then, the mixing speed was increased to 100 rpm. After mixing for 11 min. following completion of the additions, the mixing chamber was cooled to 150° C. (about 3 min.), and the mixture was removed from the mixer.

After cooling was completed, 12 g of solidified mixture was placed between two sheets of polyimide film with 10 mil shims inserted between the polyimide film. The polyimide sheets with the solidified mixture were placed in a Carver press at 150° C. After heating for 3 min. with no applied pressure, the press was closed for 5 sec. using 150 psi. The resultant film with polyimide sheets still attached was then immersed into deionized water at ambient temperature. The polyimide film was removed and the resultant film washed and dried as described in Example 1 except that isopropyl alcohol was used to extract the PC. Measurements made on the film with and without additional heat processing are presented in Table 7.

TABLE 7

|  | After Washing/Drying, Before Heating | After Heating for 10 min. at 180° C. |
| --- | --- | --- |
| Caliper | 13 | 13 |
| Gurley (sec./50 cc) | 274 | 77 |
| Bubble Point (microns) | 0.21 | 1.85 |
| Resistivity (ohm-cm) | 2.97 | 0.69 |

Example 9

Batteries with HDPE—TIPT Cathode

Coin cells were produced from the HDPE cathode material similar to those described in Example 1, above. The film was washed three times for twenty minutes with toluene to remove the oil. For selected cells, the films similar to the films of Example 1, prior to the final heating step, were further processed. Three cells were made using films produced from each of four different processing approaches for a total of twelve cells.

A 12 inch×12 inch polymeric electrode film was cut into four equal pieces. The first piece was untreated. The second piece was calendered by seven passes through a 6 inch diameter steel mill from Reliable Rubber & Plastic Machinery Co., Inc., North Bergan, N.J.). During the seven passes through the mill, the gap in mils was set as follows: 10, 9, 8, 7, 6, 5, 4. The third piece was heat treated in an oven for 10 minutes at 135° C. The fourth piece was heat treated according to the treatment of the third piece followed by calendering by five passes through the mill. The gap during the calendering of the fourth piece was progressively reduced as follows: 11, 10, 9, 8, 7.

The four processed sheets were cut into three 7.1 mm diameter circular electrodes. The cathodes had a weight of about 15–17 mg. Three lithium half cells were produced from these electrodes. The cells made from the uncalendered electrodes had a thickness of about 0.009 inches to about 0.010 inches, while the cells from the calendered electrodes had a thickness of about 0.007 inches, based on the sum of the thicknesses of the dry components. An aluminum current collector was placed adjacent to the polymer cathode. The separator had a ⅜ inch diameter and was 0.001 inches thick, porous polyethylene separator sold as Cotran™ 9711 (Minnesota, Mining & Manufacturing, Maplewood, Minn.), and the anode was a lithium disc in contact with a copper current collector.

All cut-out electrodes and separators were soaked in a vial of electrolyte for a minimum of 20 minutes. The electrolyte contained 1 M $LiPF_6$ in an equal volume mixture of ethylene carbonate and diethyl carbonate. Each electrode and separator was removed soaking wet and assembled into a cell. The elements were placed within an anode can with a cathode cover. Up to about 10 microliters of additional electrolyte was added based on visual indicators or poor wetting.

Figure 4:
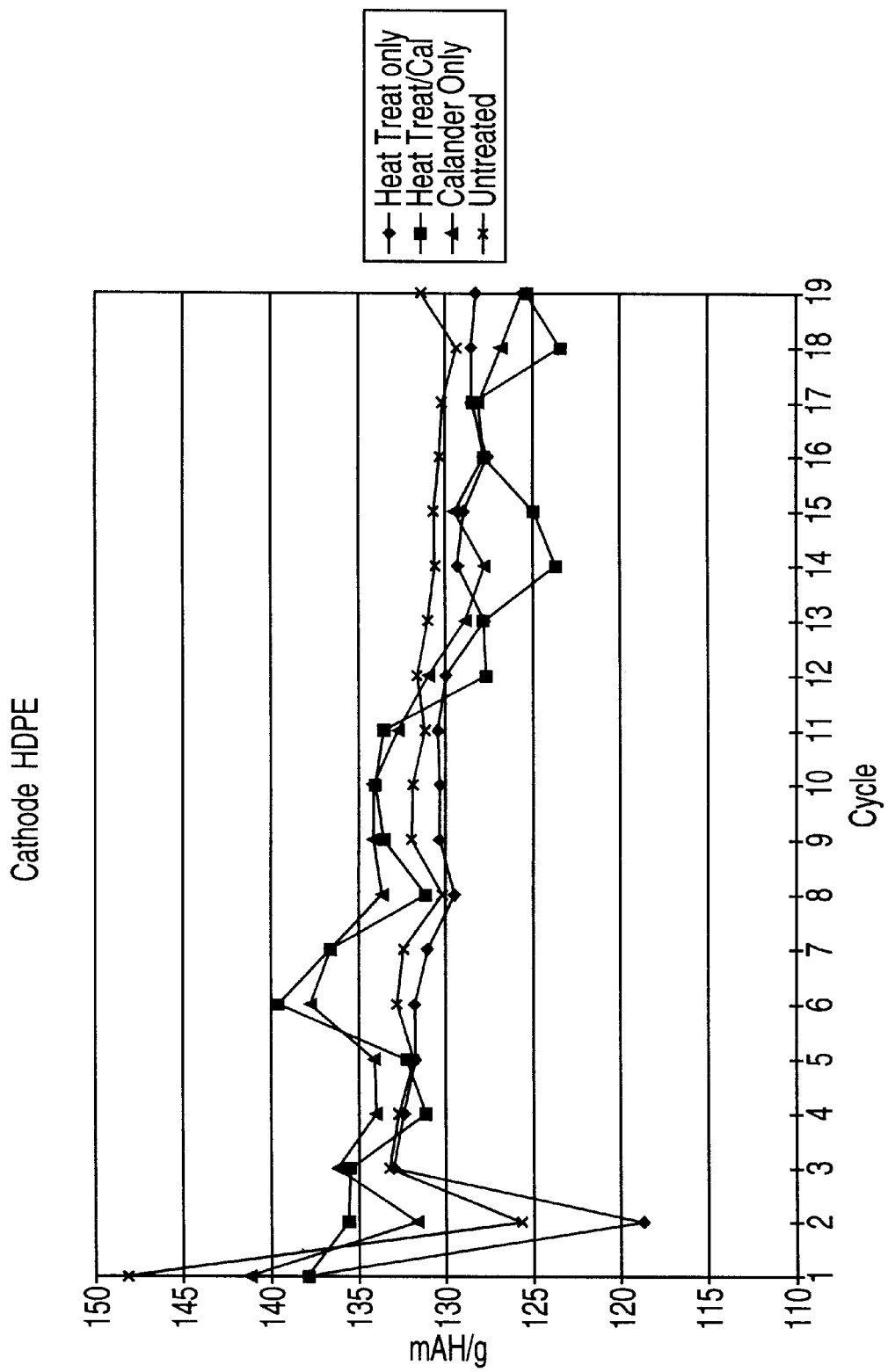
FIG. 4 is a plot of average capacity in milliamp hours/gram (mAh/g) as a function of battery cycle for coin cells produced having a cathode with high density polyethylene. Some of the cathodes had additional treatment with heat and/or calendering.

The cells were first charged at 4.30 volts with a current of 0.5 ma/cm$^2$ to a capacity of 170 mAh/gram active material. The cells were then cycled from 3.50–4.20 volts at 0.5 ma/cm$^2$. The charging and cycling was performed on a Maccor series 2000 battery tester (Maccor Inc., Tulsa, Okla.) operated with generation 3.0 software. The results from equivalent cells of each type were averaged. The results are shown in FIG. 4. The total capacity of the cells were measured in milliamp-hours per gram of active material, $LiCoO_2$. In examples 10–16, three cells generally are averaged, although occasionally only two cells were produced.

Example 10

Batteries with UHMWPE—TIPT Cathode

Films were prepared as described above in Example 2. The films were washed three times for 20 minutes with toluene to remove the oil. The film following washing was 0.011 inches thick. Then, the films were calendered in the dual 6 inch diameter steel mill as in Example 9, where the gap in mils was reduced as follows: 7.5, 5.0, 2.5, 1.0, 0.5, 0.0. (Note that the gap settings on the mill were not recalibrated.) After calendering, the film had a thickness of 0.006 inches. The electrodes had a weights ranging from 14.9 to 15.6 mg.

Figure 5:
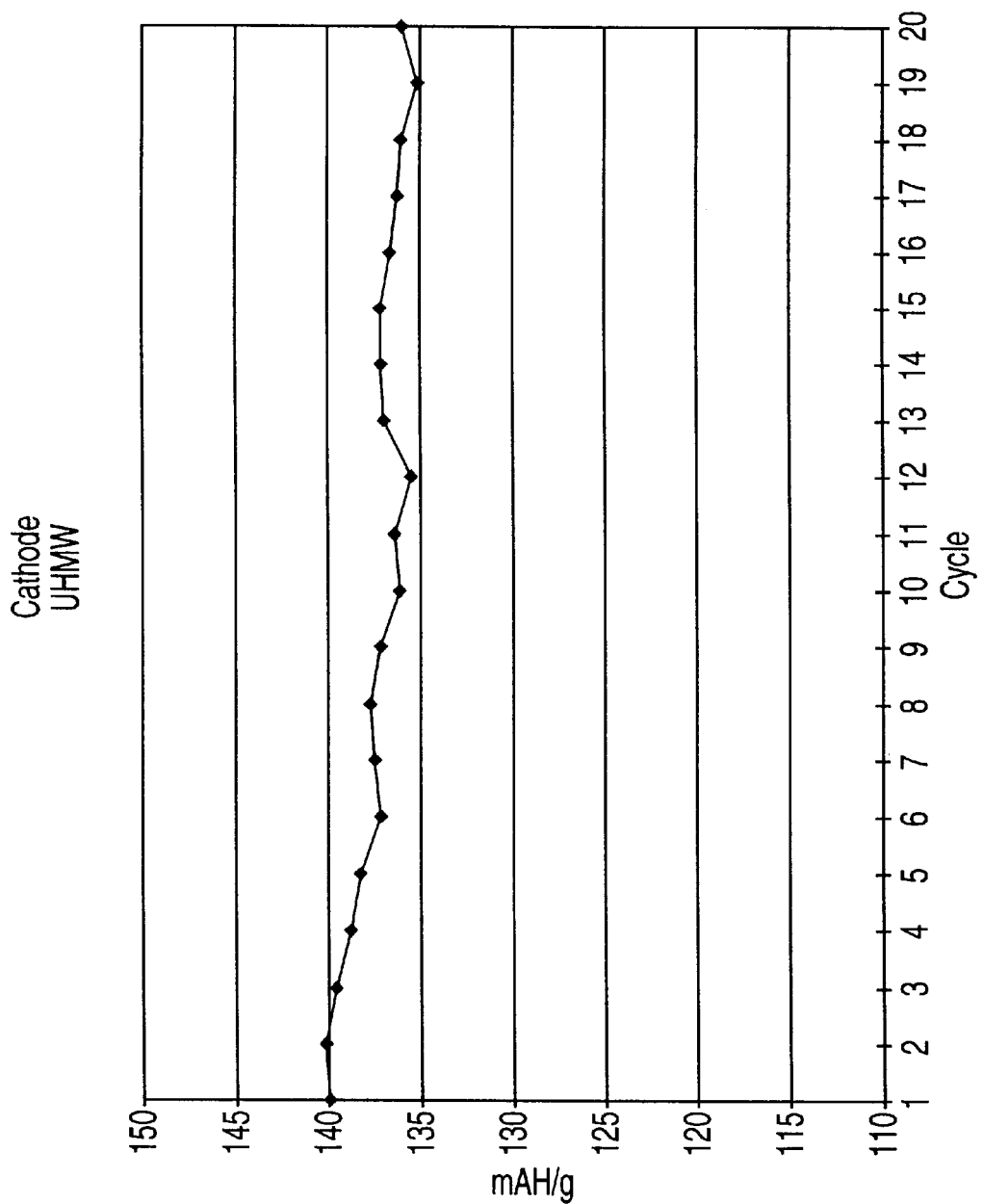
FIG. 5 is a plot of average capacity (mAh/g) as a function of battery cycle for coin cells produced having a cathode with ultra high molecular weight polyethylene.

Batteries were prepared a: described in Example 9. Measurements were made on the total capacity of the cells. The results are shown in FIG. 5.

Example 11

Batteries with PP—TIPT Cathode

The films were prepared as described in Example 3. The films were washed three times for twenty minutes with toluene to remove the oil. The film following washing and drying was 0.008 inches thick.

The dried film was cut into four equal pieces for further processing. The first piece received no further processing. The second was calendered as described above where the gap was progressively reduced in inches as follows: 0.008, 0.007, 0.006. The third piece was heated in an oven for twelve minutes at 170° C. The fourth piece was heated comparably to the third piece and also calendered, where the gap was progressively reduced in inches as follows: 0.010, 0.009, 0.008, 0.07, 0.006.

Figure 6:
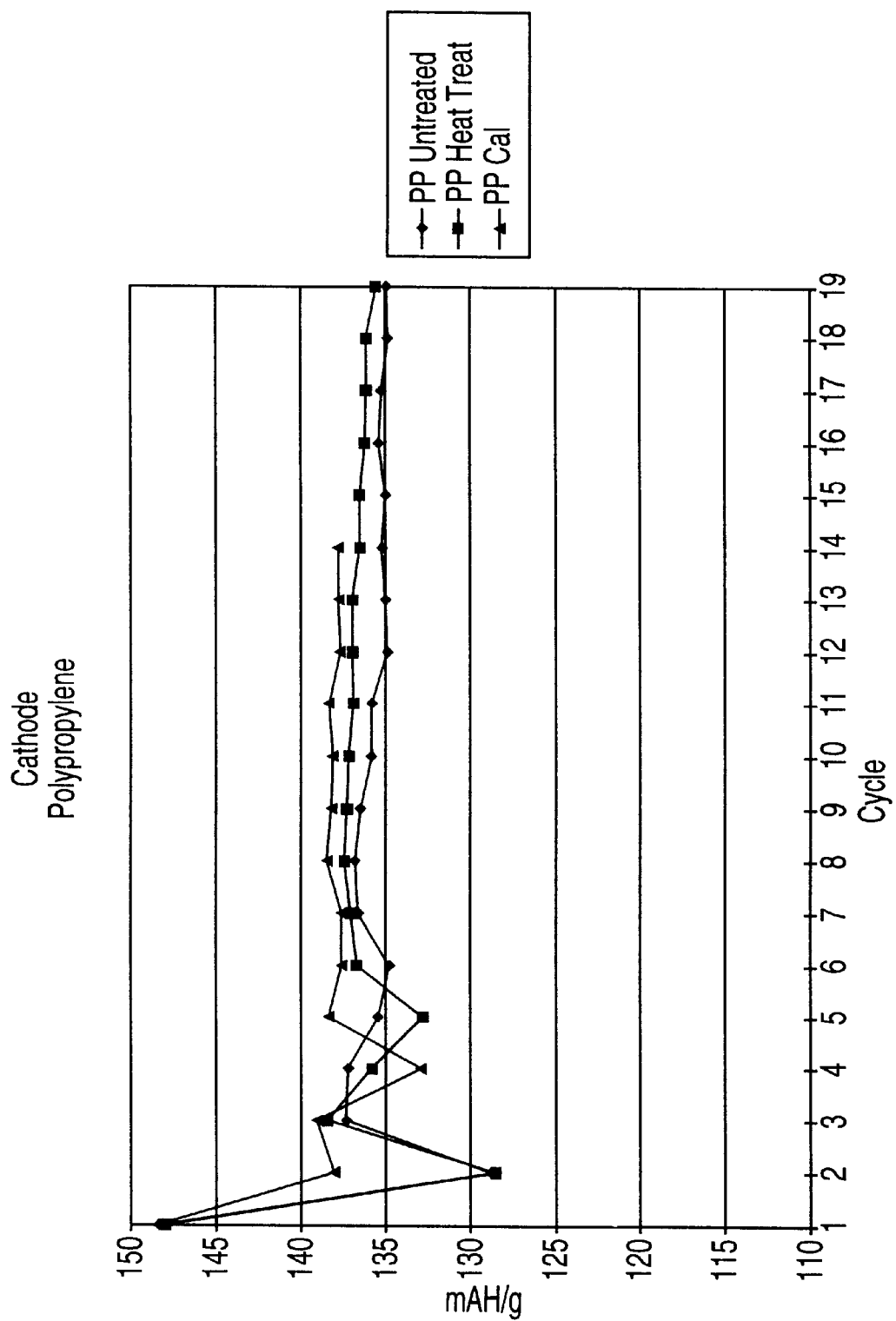
FIG. 6 is a plot of average capacity (mAh/g) as a function of battery cycle for coin cells produced having a cathode with polypropylene. Some of the cathodes had additional treatment with heat and/or calendering.

Batteries were constructed from each cathode film as described in Example 9. The total capacity of the batteries were measured over many discharge/recharge cycles. The results from similarly processed cells of each type were averaged. The results are plotter in FIG. 6.

Example 12

Batteries with PVDF—TIPT Cathode

Cathode films were prepared as described in Example 4. The films were washed three times for twenty minutes in isopropyl alcohol to remove the PC. The washed and dried films were 0.011 inch thick.

The dried films were cut into four equal pieces for further processing. The first piece received no further processing. The second piece was calendered as described in Example 9, where the gap was progressively reduced in inches as follows: 0.011, 0.010, 0.009, 0.008. The third film was heat treated in an oven for ten minutes at 180° C. The fourth film was heat treated like the third film and further calendered, where the gap was progressively reduced in inches as follows: 0.014, 0.013, 0.012, 0.011, 0.009, 0.00.8.

Figure 7:
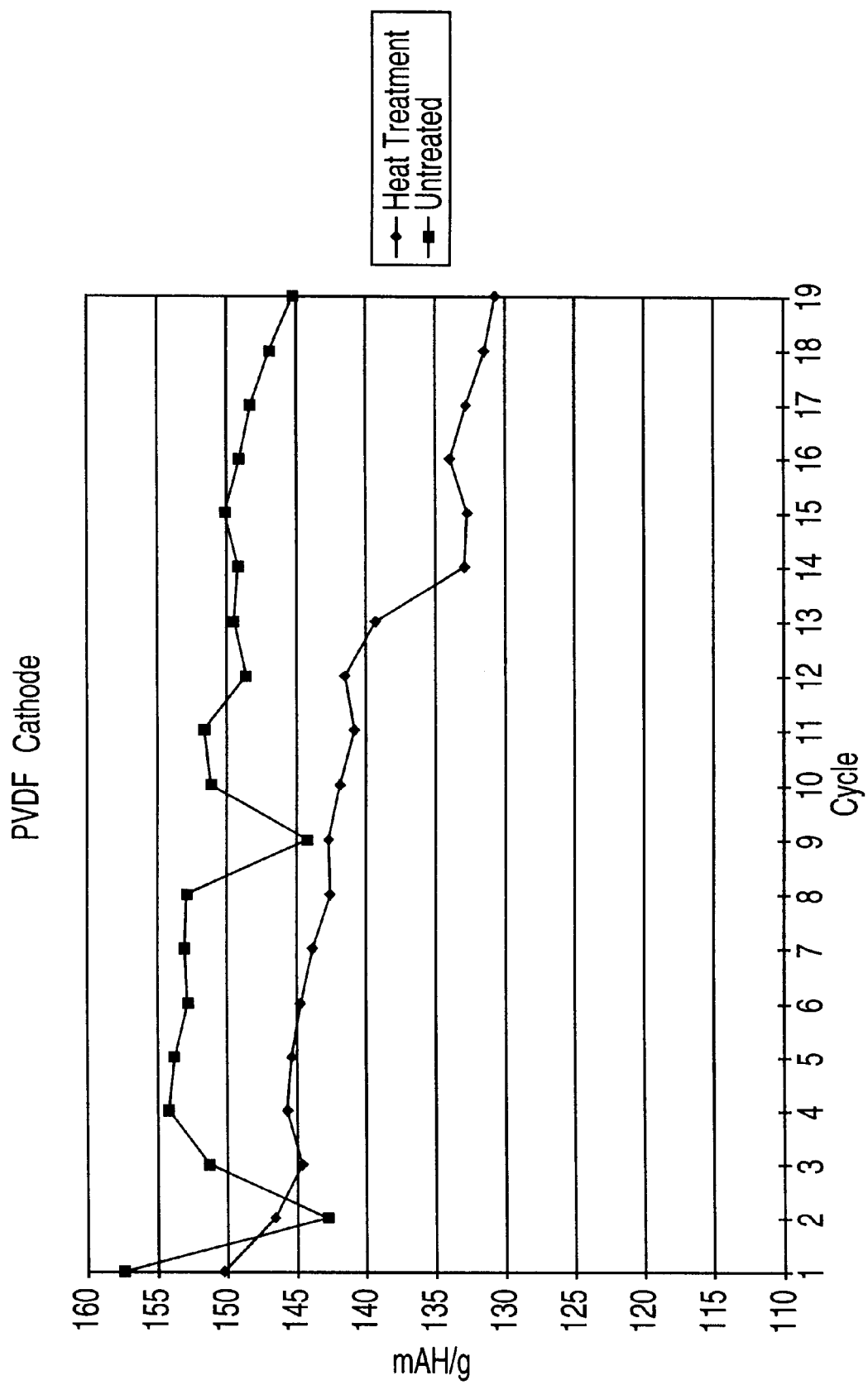
FIG. 7 is a plot of average capacity (mAh/g) as a function of battery cycle for coin cells produced having a cathode with polyvinylidene fluoride. Some of the cathodes had additional treatment with heat.

Batteries were constructed as described in Example 9. Cells were made from each of the four different cathode films. The total capacity of the cells were measured over several cycles. The measurements from equivalent cells of each type were averaged. The results are plotted in FIG. 7.

Example 13

Batteries with HDPE—TIPT Anode

Anode films were prepared is described in Example 5. The films were washed three times for twenty minutes with toluene to remove the oil. The washed and dried film had a thickness of 0.065 inches.

The film was cut into two equal pieces for further processing. The first piece was calendered as described in Example 9, where the gap in mills was progressively reduced as follows: 10, 9, 8, 7, 6, 5, 4, 3, 2, and for two passes at gap setting of: 1, 0, −1. The second piece was heated with a heat gun, Master Heat Gun model HG-501A (Master Appliance Corp., Racine, Wisc.) with a maximum heat for the model ranging between 260° C. and 399° C. A strip of washed film was clipped with a paper clip to an aluminum foil tray, and then heated with the heat gun until a visible darkening of the film is observed and the piece shrinks. The total time of the heat treatment was about 20 seconds Heating is complete when no further shrinkage or color change is observed.

Batteries were made from the two differently processed films as described in Example 9. The polymer anode is placed adjacent a copper current collector. The separator was a Cotran™ 9711 polyethylene separator. A lithium disc adjacent a copper current collector is used as the cathode. All cut-out electrodes and separators were soaked in a vial of electrolyte fog a minimum of 20 minutes. The electrolyte contained 1M $LiPF_6$ in an equal volume mixture of ethylene carbonate and diethyl carbonate. Each electrode and separator was removed soaking wet and assembled into a cell. The structure is placed in an anode can with a cathode cover. Up to about 10 microliters of additional electrolyte was added eased on visual indications of poor wetting.

Figure 8:
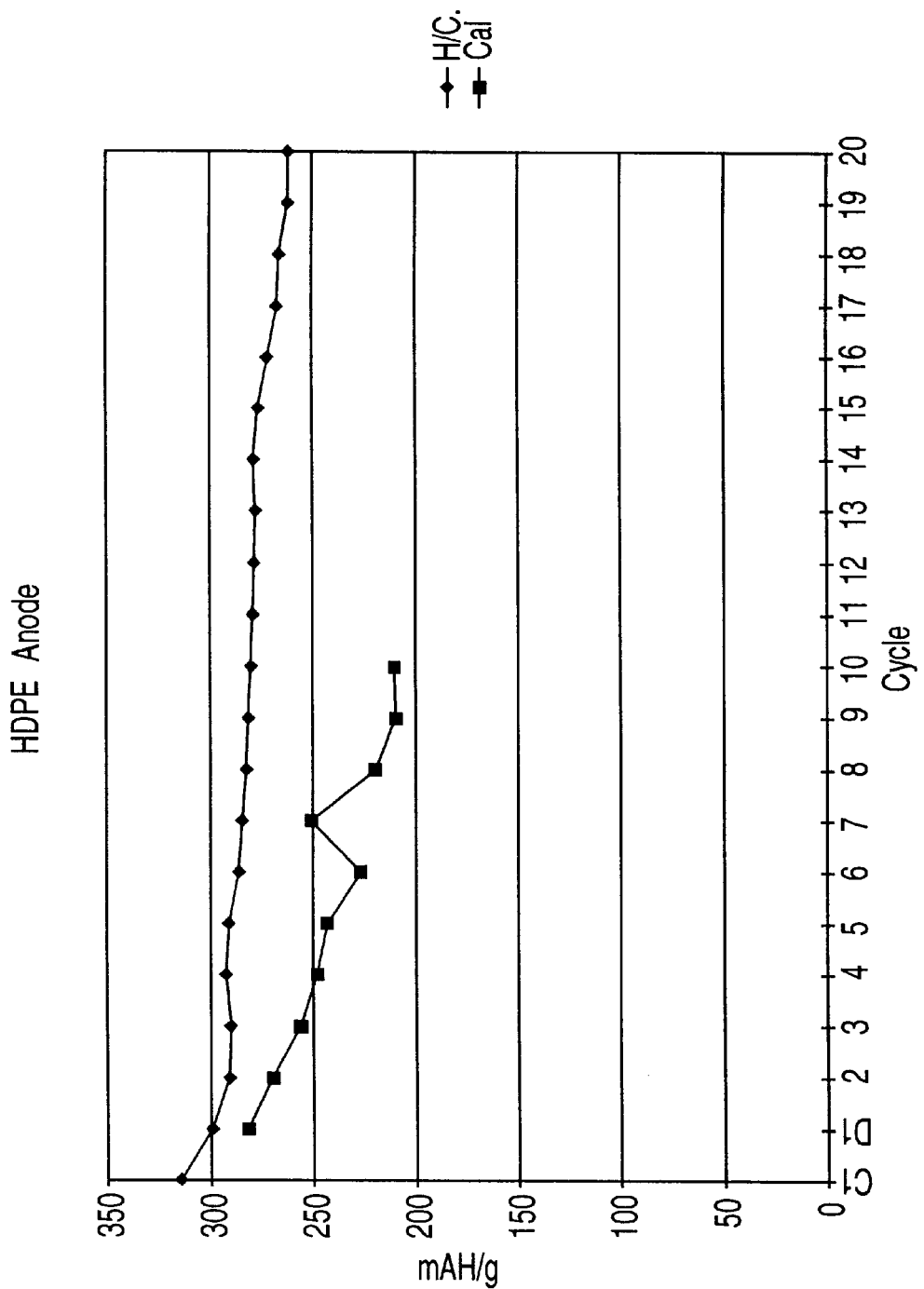
FIG. 8 is plot of average capacity (mAh/g) as a function of battery cycle for coin cells produced having an anode with high density polyethylene. Some of the anodes had additional treatment with heat and/or calendering.

The total capacity of each cell was measured over several discharge/recharge cycles. An initial discharge is performed at 0.0 volts at a current of 0.5 ma/cm$^2$ to a capacity of 360 mAh/gram of active material. The cell is then cycled between 0.01–1.5 volts at a current of 0.5 ma/cm$^2$. The results for equivalent cells were averaged. The results are plotted in FIG. 8

Example 14

Batteries with UHMWPE—TIPT Anode

Anode film material was prepared as described in Example 6. The film was washed three times for twenty minutes with toluene. The washed and dried film was 0.0065 inches thick.

The dried film was cut into four equal pieces. The first piece received no additional processing. The second piece was calendered as described in Example 9, where the gap was progressively reduced in mils as follows: 6, 5, 4, 3. The third piece was heat treated for ten minutes at 136° C. The fourth piece was heat treated like the third piece. After heat treatment, the fourth piece was calendered, where the gap was progressively reduced in mils as follows: 5, 4, 3.

Figure 9:
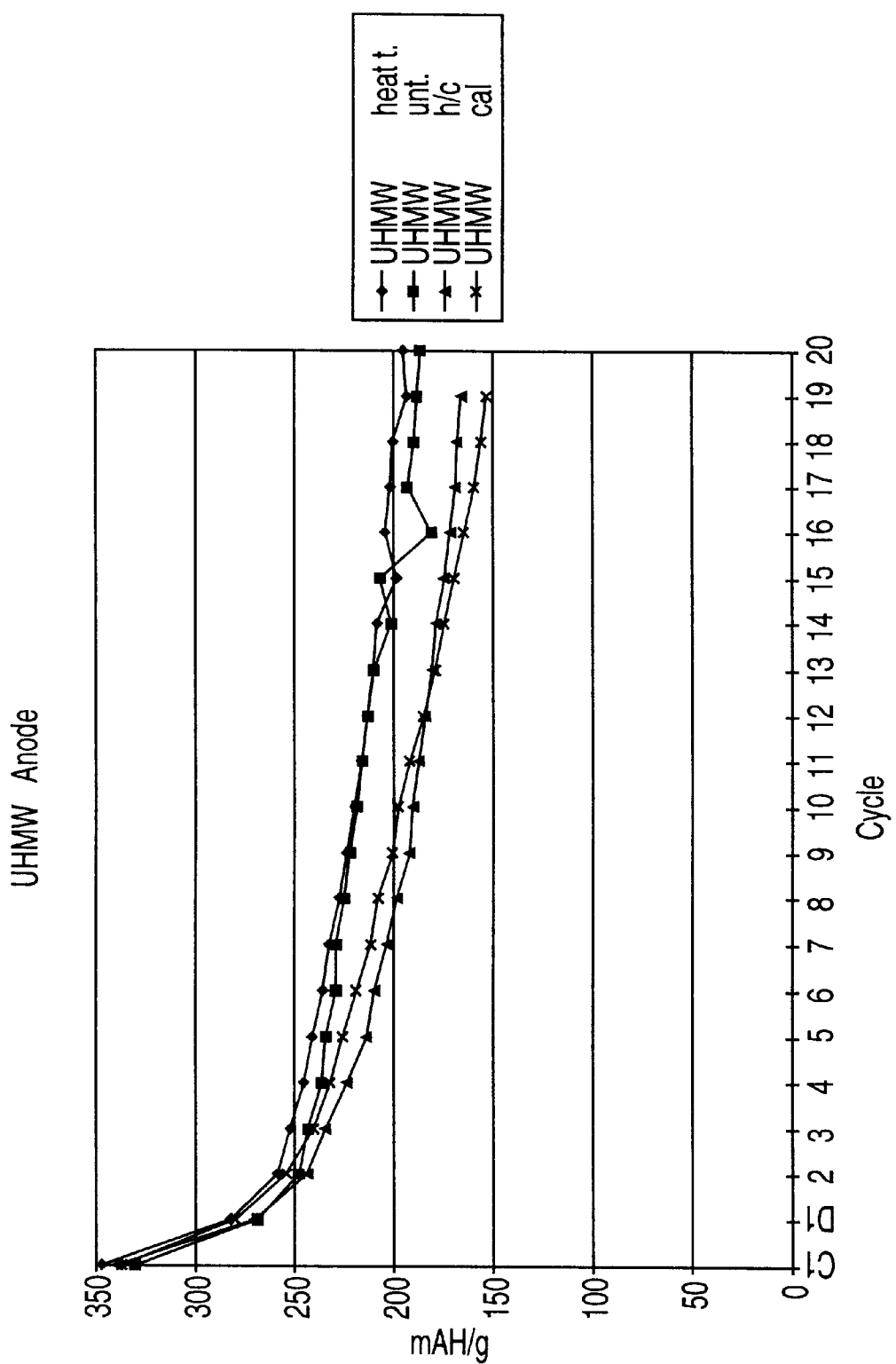
FIG. 9 is a plot of average capacity (mAh/g) as a function of battery cycle for coin cells produced having an anode with ultra high molecular height polyethylene. Some of the anodes had additional treatment with heat and/or calendering.

Batteries were constructed as described in Example 9 from each differently processed anode film. The total capacity of the cells were measured over several discharge/recharge cycles. The results for batteries constructed from the equivalently processed anode films were averaged. The results are presented in FIG. 9.

Example 15

Batteries with PP—TIPT Anode

The anode film materials mere prepared as described in Example 7. The film was washed three times for twenty minutes with toluene. The washed and dried film was 0.0065 inches thick.

The dried film was cut into four equal pieces. The first piece received no additional processing. The second piece was calendered as described in Example 9, where the gap was progressively reduced in mils as follows: 7, 6, 5, 4, 3, 3 (second pass). The third piece was heat treated for ten minutes at 136° C. The fourth piece was heat treated like the third piece. After heat treatment, the fourth piece was calendered, where the gap was progressively reduced in mils as follows: 9, 8, 7, 6, 5, 4, 3, 2.

Figure 10:
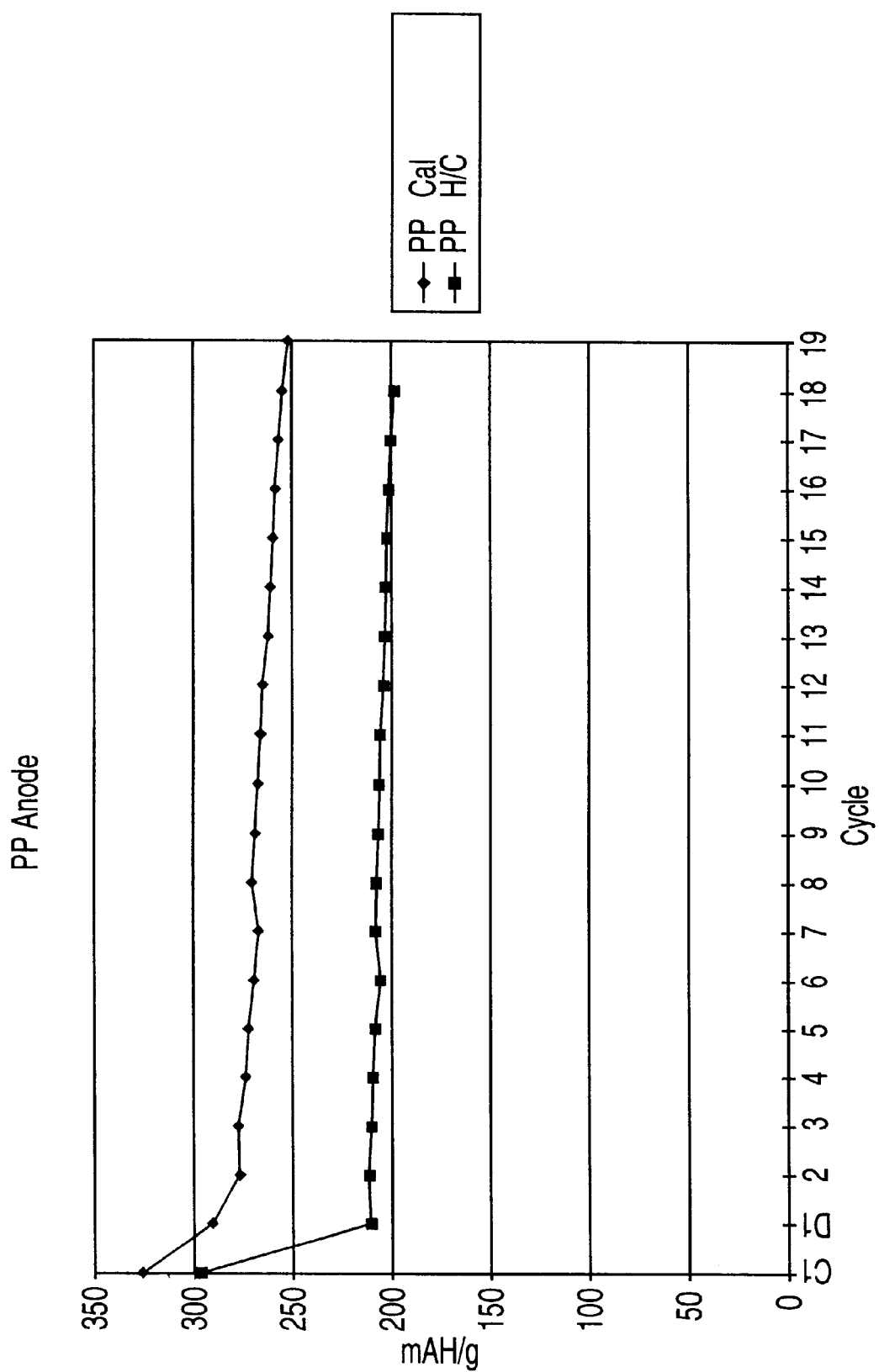
FIG. 10 is a plot of average capacity (mAh/g) as a function of battery cycle for coin cells produced having an anode with polypropylene. Some of the anodes had additional treatment with heat and/or calendaring.

Batteries were constructed as described in Example 9 from each differently processed anode film. The total capacity of the cells were measured over several discharge/recharge cycles. The results for batteries constructed from the equivalently processed anode films were averaged. The results are presented in FIG. 10.

Example 16

Batteries with PVDF—TIPT Anode

The anode films were prepared as described in Example 8. The films were washed three times for twenty minutes with isopropyl alcohol to remove the PC. The washed and dried film was 0.012 inches thick.

The dried film was cut into pieces. The first piece received no further processing. The second piece was heat treated in an oven for ten minutes at 180° C.

Figure 11:
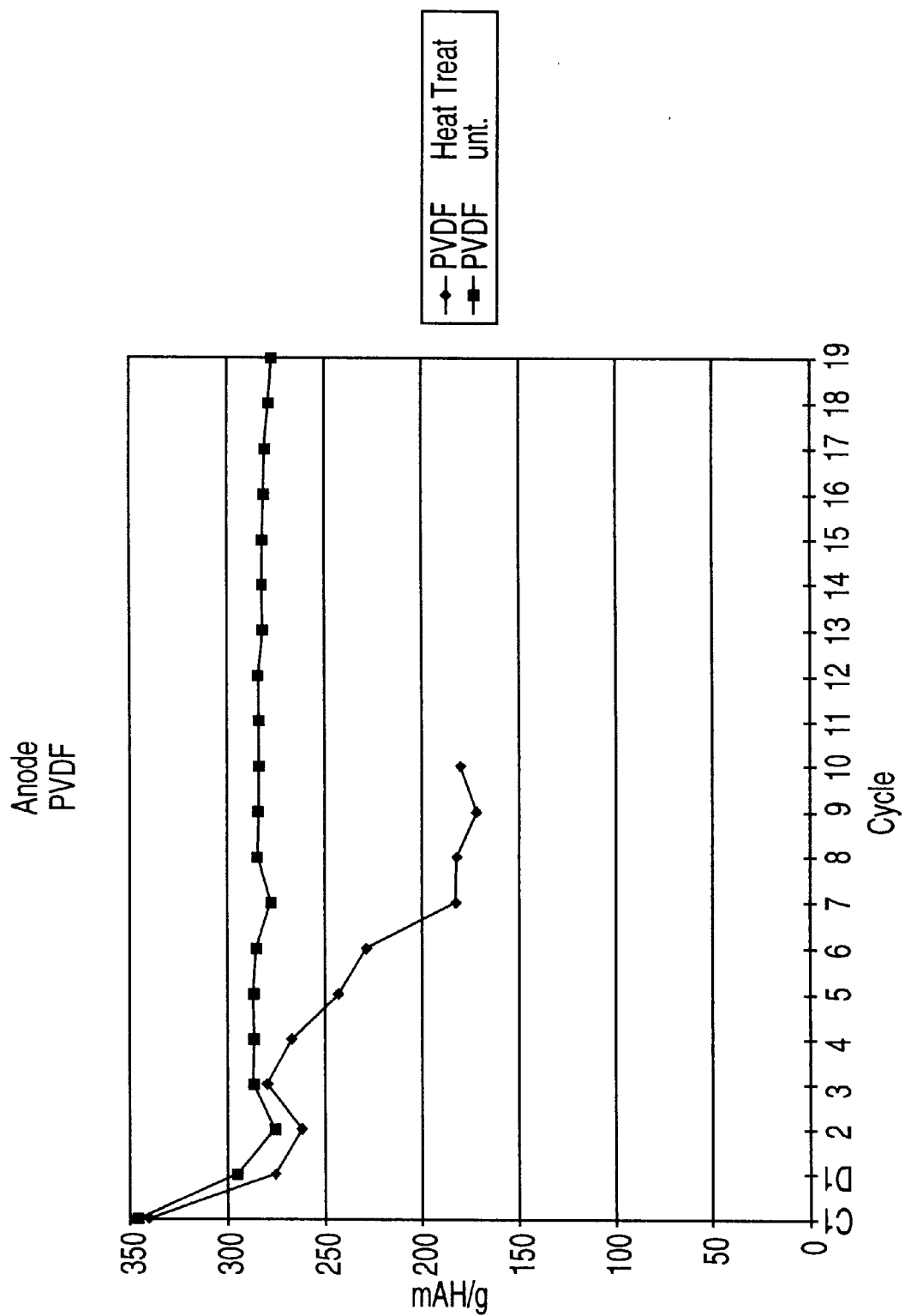
FIG. 11 is a plot of average capacity (mAh/g) as a function of battery cycle for coin cells produced having an anode with polyvinylidene fluoride. Some of the anodes had additional treatment with heat.

Each piece of anode film was used to produce batteries as described in Example 9. The total capacity of the resulting cells were measured. The measurements for equivalent cells were averaged. The results are plotted in FIG. 11.

Example 17

Polytetrafluoroethylene—PF Anode

A 30 g portion of XP3 grace petroleum coke from Conoco, Ponca City, Okla. was mixed in a beaker with 1.6 g of Teflon® 6C brand polytetrafluoroethylene, PTFE, from DuPont (Wilmington, Del.) and a 40 g portion of Fluorinert FC-40 solvent from 3M (Saint Paul, Minn.). The material was passed through a roll mill set at a 100 mil gap with the roll temperature at 125° F. The resulting mass was folded into 3 layers and again passed through the mill with an orientation 90° to that of the first pass. This process of folding, rotating 900 and milling was repeated 12 times. The resulting web was then passed through the mill with successive gaps of 75, 50, 35, an(i 15 mils with consistent orientation. Next, the web was folded into 8 layers then passed through the mill with successive gaps of 100, 75, 50, 35, 20, 15, 10 and 7 mils with consistent orientation. The resulting electrode material was dried at 160° C. in a forced air oven overnight.

A 7.3 mm diameter circular piece was cut from the material to form an electrode. The circular electrode had a weight of 11.4 mg and a thickness of 250 microns. Then, the electrode was placed in a standard 1225 size coin cell with metallic lithium as the counter electrode, and a porous Cotran™ 9711 separator between the two electrodes. A 30 μl portion of 1 M lithium hexafluorophosphate (LiPF$_6$) solution in an equal volume mixture of ethylene carbonate and diethyl carbonate was added as the electrolyte, and copper and aluminum discs as current collectors were placed on the negative and positive sides of the cell respectively.

The cell was cycled at room temperature at a constant current rate of 0.72 mA on charge and 0.216 mA on discharge between voltage limits of –0.025 and 1.0 volt. The cell provided specific capacity on the first deintercalation of 193 milliampere hours per gram (mAh/g) based on the weight of petroleum coke. The cell subsequently was cycled over 50 times while maintaining a coulombic efficiency of greater than 99%.

Example 18

Polytetrafluoroethylene—PF Cathode

The electrode formation procedure of Example 17 was repeated using a mixture of 45 g LiCoO$_2$ from Seimi Chemical, Japan, 3.5 g of KS44 graphite from Timcal, FairLawn N.J., 1.50 g of XC-72R carbon black from Cabot Corporation, 1.58 g of Teflon 6C, and 36 g of Fluorinert FC-40. A circular electrode was cut from this material with a 7.3 mm diameter, 21.3 mg weight, and a 250 micron thickness.

A cell was built with this electrode using the same construction as example 17 above (Li anode) and cycled at room temperature with constant current rates of 0.216 mA charge and 0.72 mA discharge between voltage limits of 3.5 and 4.2. The electrode material provided 132 mAh/g based on weight of LiCoO$_2$ on the first intercalation and cycled over 35 times while maintaining coulombic efficiency greater than 99%.

Example 19

Laminate Battery (1)—PF Electrodes

The anode material of Example 17 was cut into a rectangular piece 2.5 cm by 5.4 an. This material was folded into a square and pressure bonded to a piece of interleaved copper expanded metal using 20,000 pounds of force in a Carver press. The expended metal current collector was cut to a size slightly smaller than the electrode material and had a tab extending from one edge.

Two pieces of cathode material were cut from a cathode film as described in Example 18. The pieces were 2.5 cm square. These electrode pieces were pressure bonded with 10,000 pounds of force to one another with an interleaving aluminum expanded metal current collector between the two pieces. The aluminum current collector was cut slightly smaller than the areas of the cathode pieces and had a tab extending from one side.

A separator was cut from a piece of silica filled porous polyethylene containing 52% by weight of precipitated silica. To prepare the silica filled polyethylene, 866 g of Zeothix™ 265 silica (J. M. Huber torp., Harve de Grace, Md.) was dried overnight at 250° C. in a circulating air oven. The dried silica was added to a mixture of 2572 g of mineral oil (Superla® White Mineral Oil No. 31, Amoco) and 1372 g of Span 80™ (ICI Americas, Inc., Wilmington, Del.) dispersant using a dispersator having a 2 inch saw tooth mixing head. Then, this mixture was heated to 150° C. and maintained at 150° C. for 30 min. to remove volatiles. After cooling to about 140° C., the mixture was transferred into a feed tank and pumped into an intermediate zone on a 25×825 mm twin screw extruder as in example 1 at 82.7 cc/min. Fina 1285 HDPE was metered into the feed zone at 1.53 lb/hr. The film composition was calculated from the experimentally determined total throughput rate, 10.63 lb./hr, the known HDPE feed rate, and the known dispersion composition.

The film was quenched by extrusion onto a patterned casting wheel at a set point temperature of 32° C. with the pattern having 100, 5 mil high, 45°, four sided pyramids per square inch (15.5 pyramids per square centimeter). The oil was extracted from a 6 in.×12 in. piece with toluene using three, 1 liter washes. The thickness before extraction was 0.0027 inches, and the thickness after extraction was 0.0025 inches.

Another piece of film from the same extrusion run but having a thickness of 0.0046 inches after extraction of the oil using a Vertrel 423 was found to have a bubble point of 0.13 microns and a Gurley value of 172 sec./55 cc. After heating a piece of this film at 130° C. for 10 minutes in a circulating air oven, the thickness was 0.0045 in., the bubble point was 0.21 microns, and the Gurley value was 61 sec./55 cc. These results show that silica-filled TIPT film can be prepared as a porous separator in lamination processes using heat without loss of porosity.

A piece of the 0.0025 in thick separator was cut to slightly overlap the entire area of the anode assembly. The components are arranges so that the separator and anode fold over the cathode such that all of the surface of the cathode film is opposed by the anode and the separator. In other words, the anode and the separator are folded in two and the cathode is nested inside. A cell element is created by pressure bonding the above assemblies with the separator between the anode and cathode at 5,000 pounds of force in a Carver press. The cell element was dired at 110° C. for 3 hours under vacuum.

The cell was activated by the addition of electrolyte to the above cell element. To incorporate the electrolyte, the cell element was placed in a solution of 1 molar lithium bis (perfluoroethyl)sulfonyl imide salt (3M, Saint Paul, Minn.) in a mixture of 50% by volume ethylene cell element absorbed 25% of its original dry weight. The resulting electrochemical cell (EC) had a weight of 1.82 g wet and a volume of 0.6 cc. The EC was heat sealed in a pouch made from 3 mil polyethylene film with the tab ends of the current collectors protruding through the heat seal to provide electrical terminals.

The battery assembled above was cycled at a constant 13 mA current between voltage limits of 4.2 and 2.75 Volts. The battery provided 52.6 mAh of capacity and 182.3 mwh of energy on the first discharge. This translates to 100 Watt-hours/Kg (Wh/Kg) specific energy and 300 Wh/L of volumetric energy based on the dimensions of the EC. A surprising result was that this level of energy storage capability was obtained in a liquid electrolyte cell operating with no external stack pressure. The constant current charge was interrupted at 4.2 Volts for 30 minutes. The impedance of the cell in ohm square centimeters at various time intervals determined from the resulting voltage relaxation are tabulated below:

| Relaxation Time | Area Specific Impedance: $\Omega \cdot cm^2$ |
|---|---|
| 10 milli-seconds | 30 |
| 1 second | 35 |
| 1 minute | 55 |
| 30 minutes | 130 |

The internal resistance of the cell as indicated by the above impedance values is comparable to commercial lithiumion ion batteries, however, without the need for stack pressure. The battery was cycled for 50 cycles and maintained coulombic efficiency of greater than 98%.

Example 20

Laminate Battery (2)—PF Electrodes

The anode material and cathode material from examples 17 and 18, respectively, were cut into strips 15 cm by 5 cm. A similar size strip of silica filled PTFE web (Empore™, Minnesota, Mining and Manufacturing, Saint Paul, Minn.) for use as a separator is saturated with a 50% by volume mixture of isopropyl alcohol and water. The saturated silica filled PTFE web is passed through the nip of a calendering mill set at a gap of 7 mils. This reduced the thickness of the material from about 0.023 inches to about 0.011 inches. The anode, separator and cathode layers were laminated together by passing through the structure through the nip of the calendering mill set at a 7 mil gap. The resulting laminate is 340 microns thick, and the individual layers were not separable by pulling the layers apart.

A square cell element, 3.3 cm on edge, was cut from the laminate using a fresh razor blade. Nickel and aluminum foil current collectors were cut 3.1 cm on edge with a tab area extending from one side. Nickel is used on the anode side of the cell element, and aluminum expanded metal is used on the cathode side. A conductive adhesive made by blending carbon black (Conductex 975) with a polyethylene latex was painted onto one side of each foil and allowed to air dry. The current collectors mere positioned appropriately, and a solid PTFE film was placed on either side of the electrode laminate/current collector sandwich. The cell structure was run through a heat laminator to seal the current collectors to the respective electrodes via the polyethylene based conductive adhesive. The outermost solid PTFE films acted as release liners.

The resulting cell element was dried at 110° C. for about 3 hours under vacuum in a glove box. Then, in an Argon filled glove box, the cell element was soaked in a solution of 1 molar lithium bis(perfluoromethylethyl) sulfonyl imide salt (Minnesota, Mining and Manufacturing, Saint Paul, Minn.) in a solvent with 50% by volume each of ethylene carbonate and dimethyl carbonate. The cell weighed 0.59 g dry and 0.91 g wet with electrolyte. Still inside the glove box, the activated cell was placed in a glass dish with a cover and connected by way of the protruding current collector tabs to a battery cycle. The assembled cell was charged to 4.2 volts with 28 mAh of current. Then, the cell was cycled for 20 times between 4.2 volts and 2.75 volts with an average coulombic efficiency of over 98% from cycles 2 to 20.

Example 21

Laminate Battery (3)—PF Electrodes

Anode material from Example 17 was cut into 2 squares 3.3 cm on edge. The two anode squares were painted with a conductive adhesive, as described in Example 25 below, and pressed onto opposite sides of an interleaving copper foil current collector and dried at 60° C. Cathode material, as made in Example 18 except using $LiNiO_2$ (FMC Corp., Bessemer City, N.C.) as the active material, was cut into 2 squares 3.2 cm on edge. The cathode squares were adhered to an aluminum foil current collector as described for the anode squares. A silica filled separator as described in Example 20 was cut into a square 3.8 cm on edge. The anode, separator and cathode elements were laminated together to form a cell assembly by pressing for 15 seconds at 100 pounds of force between platens heated to 150° C. with a sheet of solid PTFE film on each side of the cell assembly to act as a release liner.

The resulting cell assembly was dried at 70° for 17 hours under vacuum in a glove box. The cell assembly was then soaked in a 1 molar solution of lithium bis (perfluoromethylethyl) sulfonyl imide salt in a solvent with 50% by volume each of ethylere carbonate and dimethyl carbonate. The cell weighed 1.00 g dry and 1.28 g wet with electrolyte. The activated cell was placed in a glass dish with a cover and connected by way of the protruding current collector tabs to a battery cycler.

The cell was charged to a voltage of 4.0 with 24 mAh of current. Then, the cell was cycled 20 times between 4.0 volts and 2.75 volts with an measured, average coulombic efficiency of over 90% between cycles 2 and 20. The initial charge of the cell was interrupted for the measurement of impedance at the open circuit with an impedance spectrometer. The ohmic resistance was measured at 4.1 ohms. The cell was compressed using a clamp, and the ohmic resistance was again found to be 1 ohms. This experiment shows that the cell exhibits low internal resistance, which is not improved by the application of external stack pressure.

Example 22

Laminate Battery (4)—TIPT Electrodes

Anode material, as described in Example 5 except with XP3 petroleum coke (Conoco, Ponca City, Okla.) as the active material, was cut into 2 squares 3.3 cm on edge. Cathode material as described in example 1 was cut into two squares 3.2 cm on edge. The anode and cathode squares were secured to current collectors as described in Example 21 to form anode and cathode elements. A silica-filed separator as described in Example 20 was cut into a square 3.8 cm on edge. The anode, separator and electrode elements were laminated into a cell assembly by pressing for 15 seconds at 100 pounds of force between platens heated to 150° C.

The resulting cell assembly was dried at 70° for 17 hours under vacuum in a glove boy. The cell assembly was then soaked in a 1 molar solution of lithium bis (perfluoromethylethyl) sulfonyl imide salt in a solvent with 50% by volume each of ethylene carbonate and dimethyl carbonate. The cell weighed 0.93 9 dry and 1.15 g wet with electrolyte. The activated cell was placed in a glass dish with a cover and connected by way of the protruding current collector tabs to a battery cycler. The cell was charged to a voltage of 4.2 with 8 mAh of current. Then, the cell was cycled 20 times between 4.0 volts and 2.75 volts with an measured, average coulombic efficiency of over 90% between cycles 2 and 20.

Example 23

Laminate Battery (5)—TIPT Electrodes

To form the anode, a dry blend of 20.31 g MCMB 6-10 carbon (Alumina Trading Co., Park Ridge, N.J.) and 1.07 g of Super S conductive carbon (MMM Carbon, Brussels, Belgium) was prepared by mixing the compounds with a spatula in a beaker. Portions of the dry blend were added alternatively along with portions of a total of 28.6 g of mineral oil (Superla® White Mineral Oil No. 31, Amoco) to the mixing chamber of a Haake Rheocord System 40™ equipped with roller blades operating at 50 rpm at room temperature. Then, while heating to 270° C., 5.42 g of HDPE (GM 9255 from Fina, now available as grade 1285 from Fina) was added incrementally and the mixing rate was increased to 100 rpm. After a total of 30 min. from the beginning of HDPE addition, the mixer was cooled from 270° C. to 230° C. over a period of about 3 min. Then, the mixer was opened, and the melt was removed while still hot.

A portion of the solidified melt was placed between 0.007 in. PET cover sheets using 0.015 in. shims between the PET sheets in a Carver press at 180° C. for 5 min. Then, the press was closed fully using 100 Esi for 10 sec. The resulting film with PET cover sheets still attached was cooled by immersion into a container of water at room temperature. The film still containing oil was about 0.014 in. thick.

The anode films were washed three times for 20 minutes with toluene to remove the oil. Following drying, the anode films were heat treated with a heat gun as described in example 13. Copper EXMET™ (EXMET Corp., Naugatuck, Conn.) current collectors (cc's) were cut to fit the anode films. The heat treated films and corresponding cc's were placed in contact (initial thickness 0.0185 inches) and then calendered as described in Example 9, where the gap in mils was progressively reduced as follows: 18, 17, 15, 13, 11, 9, 7, 6, 5, 4, 3, 2, 2 (second pass). After calendering, the film/cc composite had a thickness of 0.0115 inches.

To form the cathode, a dry blend of 55.63 g $LiCoO_2$ (FMC Corp.) and 6.18 g of VXC72 conductive carbon (Cabot Corp.) was prepared by mixing the compounds with a spatula in a beaker. Portions of the dry blend were added alternatively along with portions of a total of 26.2 g of mineral oil (Superla® White Mineral Oil No. 31, Amoco) to the mixing chamber of a Haake Rheocord System 40™ equipped with roller blades. Then, while heating to a set point of 270° C., 5.42 g of HDPE (GM 9255 from Fina, now available as grade 1285 from Fina) was added incrementally. After a total of 30 min. from the beginning of HDPE addition, the mixer was cooled from 270° C. to 230° C. over a period of about 3 min. Then, the mixer was opened, and the melt was removed while still hot.

A portion of the solidified melt was placed between 0.007 in. PET cover sheets using 0.015 in. shims between the PET sheets in a Carver press at 180° C. Then, the press was closed fully using 200 psi for 10 sec. The resulting film with PET cover sheets still attached was cooled by immersion into a container of water at room temperature. The resultant cathode film still containing oil was about 0.009 to 0.010 in. thick.

The cathode films were washed three times for 20 minutes with toluene to remove the oil. The film was about 0.014 in. thick. Following drying, the cathode films were heat treated with a heat gun as described in example 13. Aluminum EXMET™ (EXMET Corp., Nalgatuk, Conn.) current collectors were cut to fit the cathode films. The heat treated films and corresponding cc's were placed in contact (initial thickness 0.010 inches) and then calendered as described in Example 9, where the gap in mils was progressively reduced as follows: 10, 9, 7, 5, 3, 2, 2 (second pass), 1, 1 (second pass). After calendering, the film/collector composite had a thickness of 0.0075 inches.

The separator was prepared as in Example 19. The thickness before extraction was 0.0032 inches, and the thickness following extraction was 0.002 inches.

The separator was cut into 5 inch×2 inch pieces. The anode and cathode were cut into 4.5 inch×1.5 inch pieces. The separator was placed between the anode and cathode with the current collectors oriented outward from the combination. Excess separator was hanging out on all four sides. The combination had a thickness of 0.021 inches. The combination was calendered twice with the same mill as described in Example 9 at gap settings of 16.5 mils and 13 mils, respectively. Excellent adhesion was observed. The lamination combination could lot be delaminated with a razor blade to obtain a distinct, intact layer. The laminated combination was placed in a jar containing a mixture of 50% by volume ethylene carbonate and 50% by volume dimethyl carbonate for seven days. The bonding of the laminate was not adversely affected by the solvent.

Example 24

TIPT Anode and Cathode

Heat treated and calendered anodes were produced as described in Example 13. The cathode films were produced as described in Example 9. The cathode films were washed three times for 20 minutes with toluene to remove the oil. Following drying, the cathode films were heat treated with a heat gun as described in example 13. The heat treated films were then calendered as described in Example 9, where the gap in mils was progressively reduced as follows: 9, 8, 7, 6, 5, 4, 3, 2, 2 (second pass). after calendering, the film had a thickness of 0.0076 inches.

Three batteries were constructed. The respective anodes had weights of 14.3 mg, 14.3 mg and 14.6 mg, and thicknesses of 0.0075 inches, 0.0)765 inches and 0.0077 inches. The separator was the sane as described in Example 13. The electrodes were cut to a diameter of 7.1 mm, and the separators were cut to diameters of 3/8 inch.

The electrodes and separators were soaked in electrolyte for 20 minutes and assembled soaking wet. The cells were assembled in the following order, cathode can, aluminum current collector, cathode, separator, anode, copper current collector, and anode cover. Up to about 10 microliters was added based on visual identification of poor wetting. The cells were cycled from 2.6 to 4.2 volts as follows:

| Cycles 1–4 | 0.5 mA/cm$^2$ |
| Cycle 5 | 1 mA/cm$^2$ |
| Cycle 6 | 2 mA/cm$^2$ |
| Cycle 7 | 6 mA/cm$^2$ |
| Cycle 8 | 10 mA/cm$^2$ |
| Cycle 9 | 20 mA/cm$^2$ |
| Cycles 10–100 | 0.5 mA/cm$^2$ |

Figure 12:
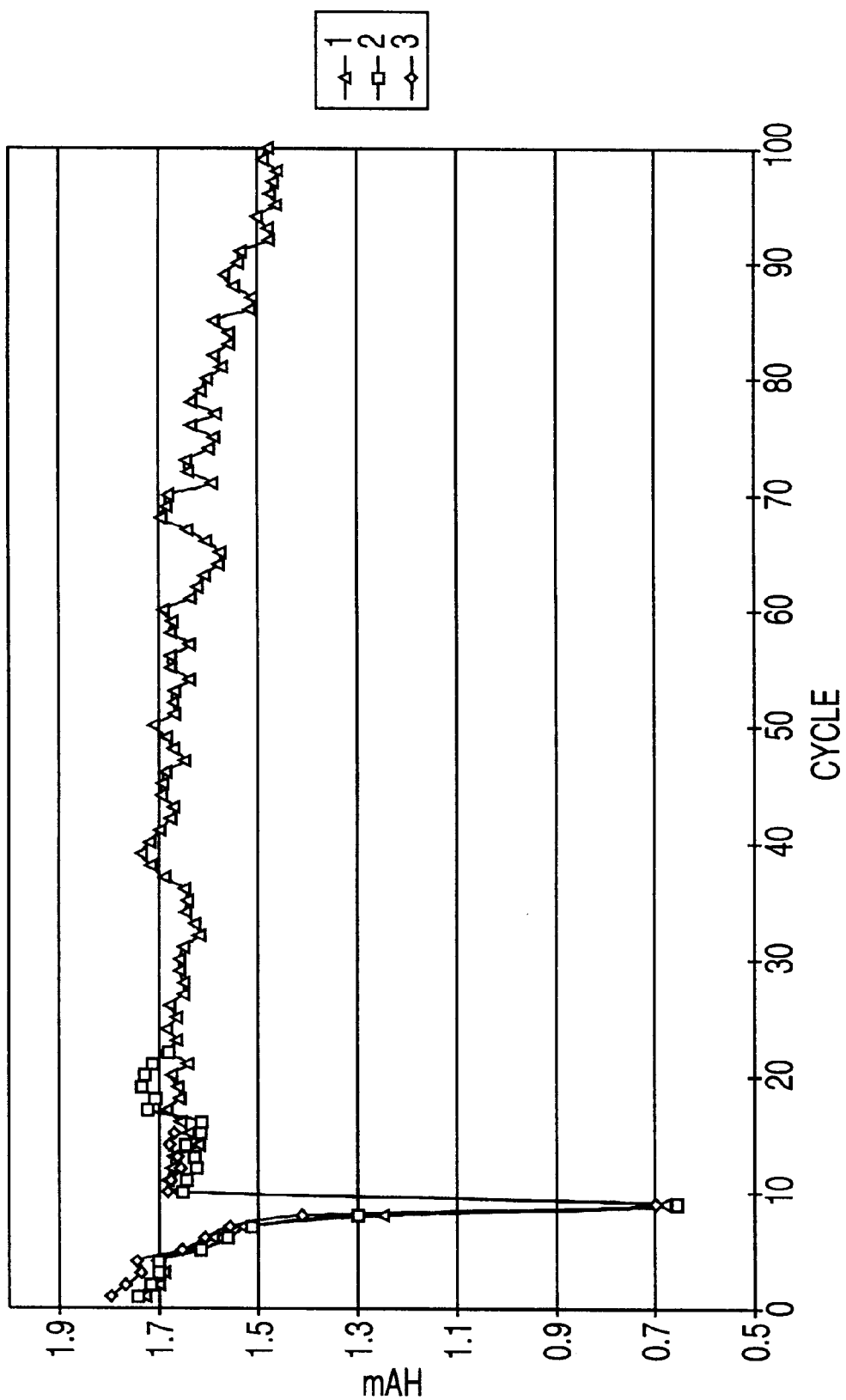
FIG. 12 is a plot of mAh us a function of battery cycle for three cells produced with TIPT electrodes.

Cycles 5–9 involved a rate capacity test. The results of the cycling are displayed in FIG. 12.

Example 25

Conductive Adhesive—Bonding of Electrodes with a Current Collector

While mixing in a dispersator, a 31.2 g quantity of Conductex™ 975 was added incrementally to 300 g of Zaikthene-N™ (Sietetsu Kagaku Co., Ltd), a polyethylene latex in which the acid groups were neutralized with sodium hydroxide by the manufacturer. After addition was completed, the mixture was sheared at about 6000 to about 7000 rpm for about 5 minutes.

A 4.25 cm$^2$ rectangle of HDPE cathode was prepared as described in Example 1. The cathode was calendered from an initial thickness of 0.0106 inches to 0.006 inches. The calendered electrode was placed in contact with a piece of aluminum foil. The resistance through the two films was measured to be 10,000 ohms. Then, some of the conductive adhesive mixture was brushed onto one side of the foil to form a thin layer. The adhesive coated side of the foil was placed against the HDPE cathode and pressed firmly into place using the flat end of a steel cylinder and hand pressure. The resulting composite structure was dried in a 60° C. forced air oven for 30 minutes. Adhesion between the foil and electrode film in the composite was found to be good. The resistance through the composite was found to be 2000 ohms.

Example 26

SEM Pictures

Figure 13A:
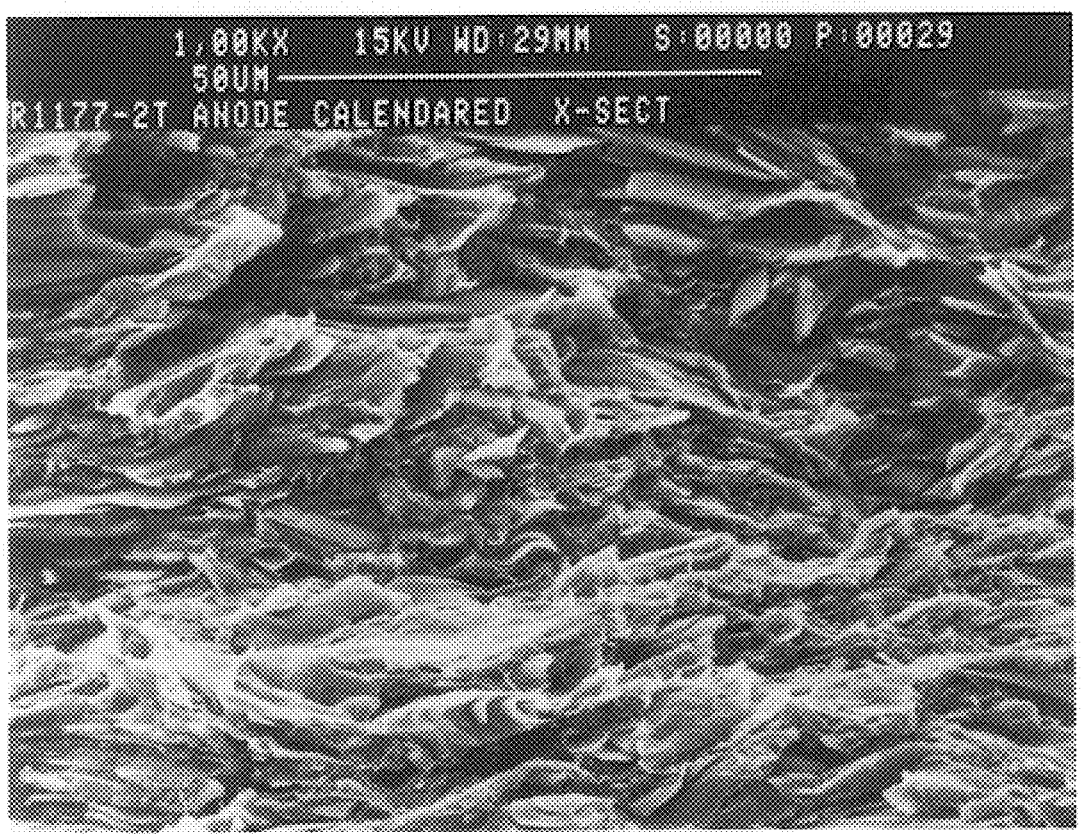
FIG. 13A is an SEM photograph of a cross section of a HDPE, TIPT anode that was calendered following extraction.
Figure 13B:
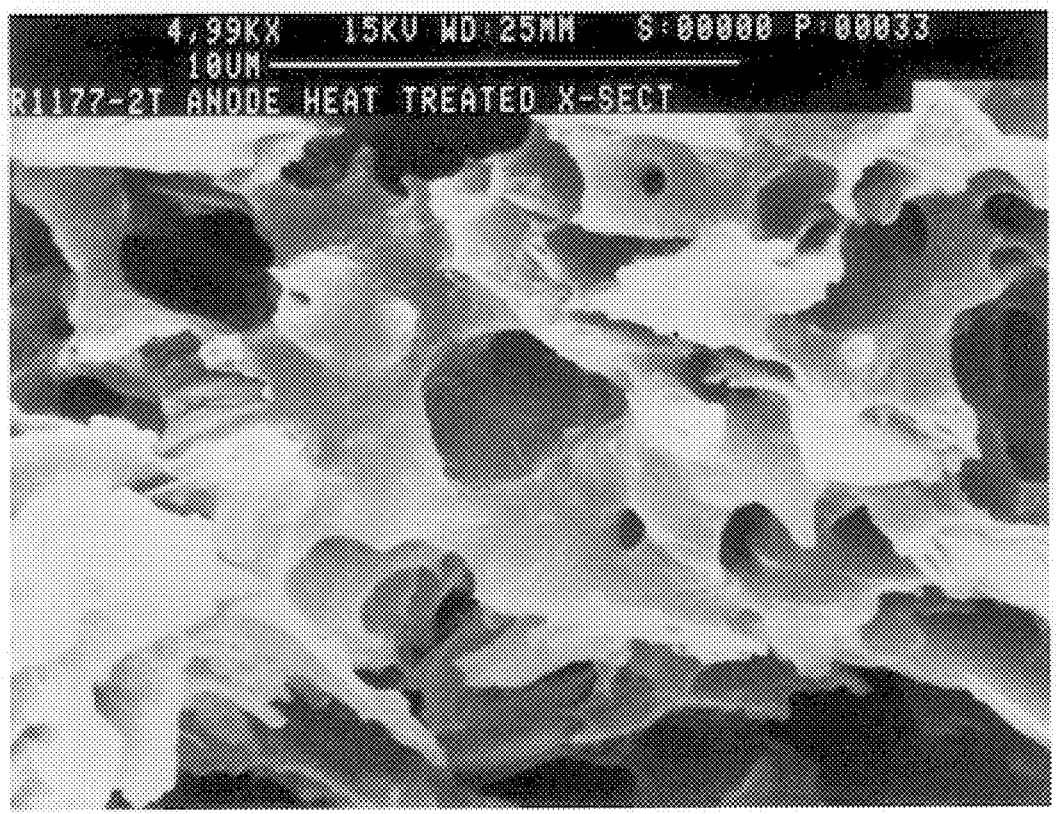
FIG. 13B is an SEM photograph of a cross section of an equivalent anode as shown in FIG. 13A that was subject to heat treatment following extraction.
Figure 13C:
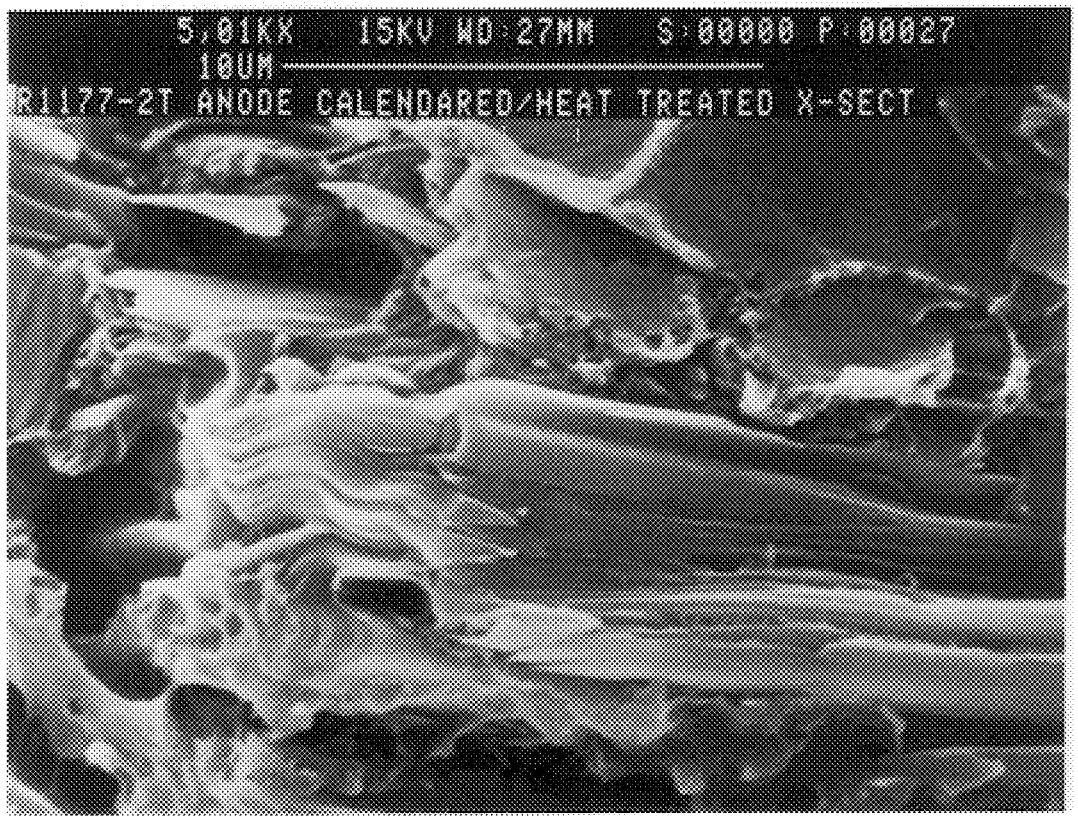
FIG. 13C is an SEM photograph of a cross section of an equivalent anode as shown in FIG. 13A that was subject to both heat treatment and calendering following extraction.
Figure 14A:
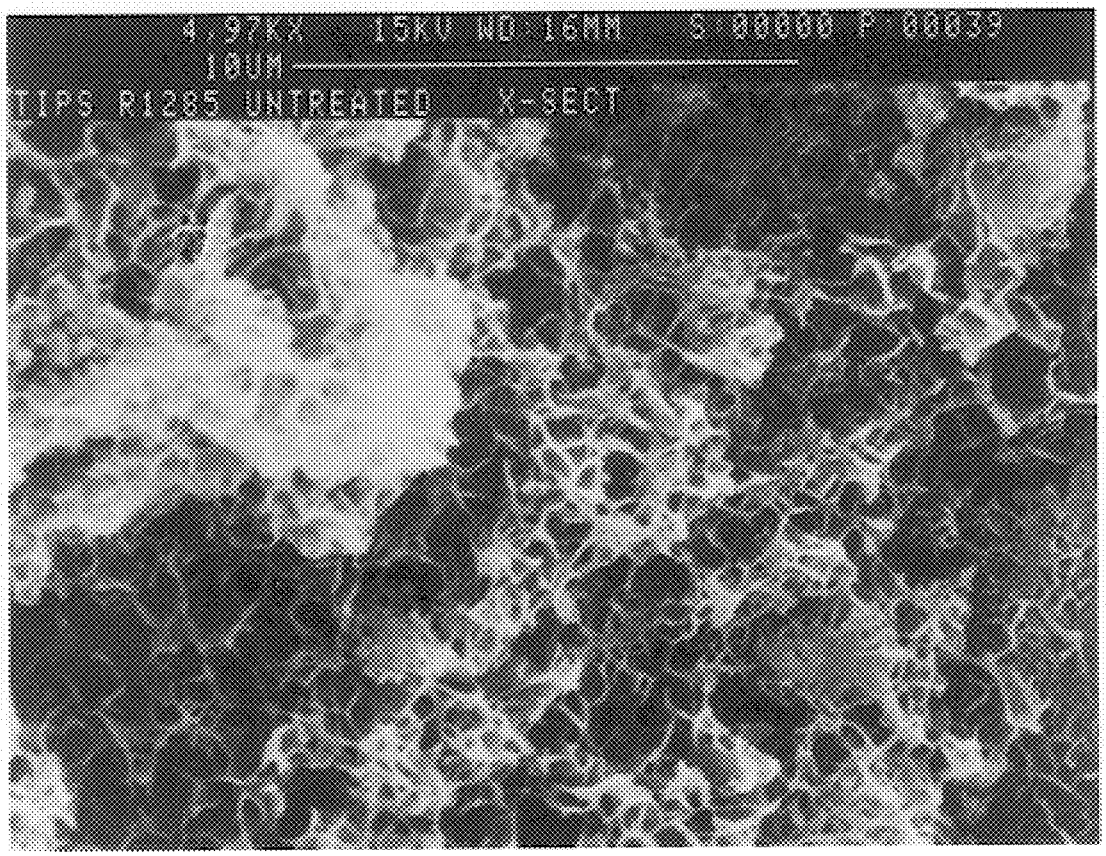
FIG. 14A is an SEM photograph of a cross section of a HDPE, TIPT anode that received no additional processing following extraction.
Figure 14B:
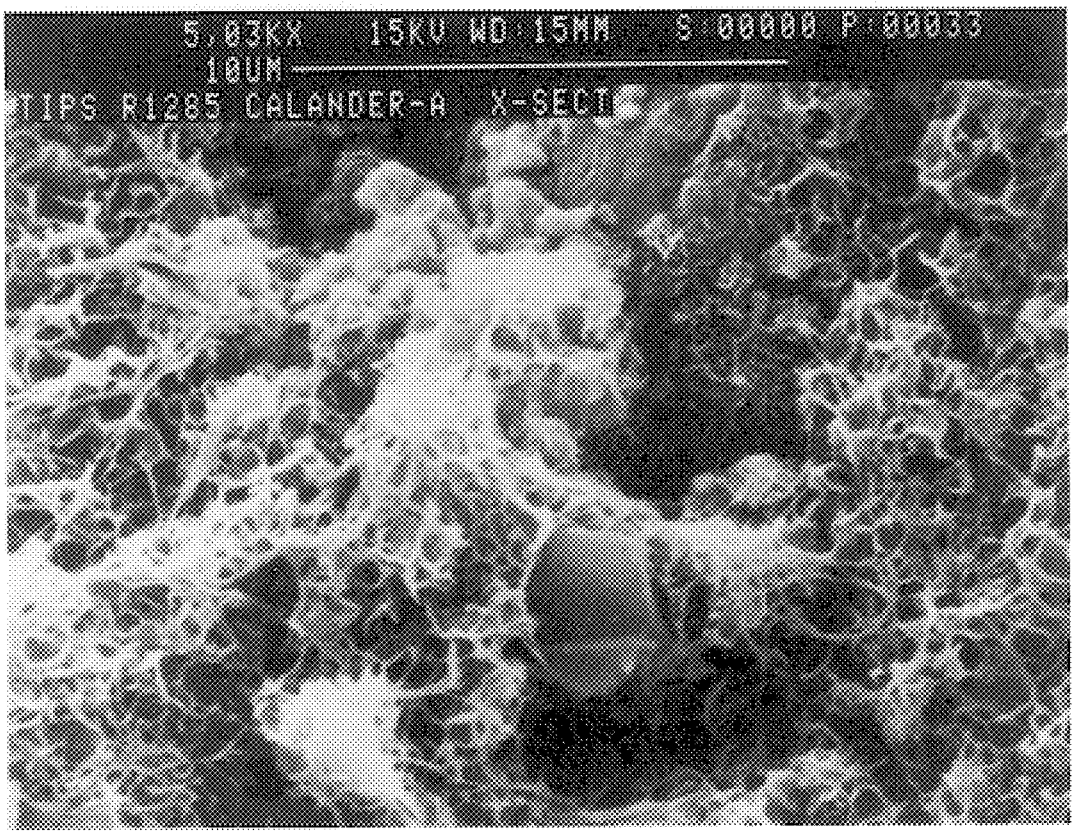
FIG. 14B is an SEM photograph of a cross section of an equivalent anode as shown in FIG. 14A that was subject to calendering following extraction.
Figure 14C:
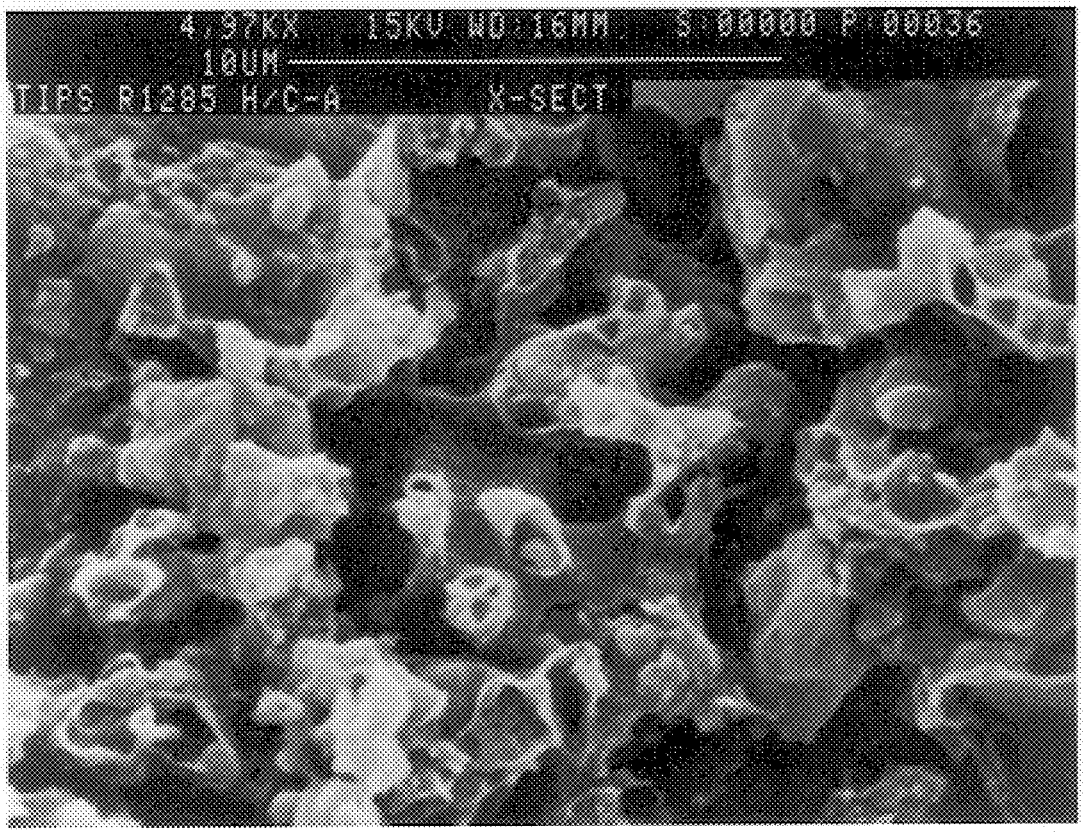
FIG. 14C is an SEM photograph of a cross section of an equivalent anode as shown in FIG. 14A that was subject to both heat treatment and calendering following extraction.

Representative SEM pictures are displayed in FIGS. 13 and 14 for anodes made from HDPE. The three micrographs in FIG. 13 provide a comparison between equivalent samples that were calendered only, heat treated only or both calendered and heat treated. Similarly, the three micrographs in FIG. 14 provide a comparison between equivalent samples that had no additional processing, or that were calendered or calendered and heat treated.

The embodiments described above are intended to be representative and not limiting. Additional embodiments of the invention are within the claims.

What is claimed is:

1. A method of producing a porous, polymer electrode comprising cooling a composition comprising a melt blend of a polymer, redox active particles, electrically conductive particles chemically distinct from said redox active particles and a solubilizinig amount of a diluent to induce a phase transition, said polymer comprising polypropylene, poly (tetrafluoroethylene-co-perfluoro-(propyl vinyl ether)) or polyvinylidine fluoride.

2. The method of claim 1, wherein said electrically conductive particles comprise electrically conductive carbon.

3. The method of claim 1, further comprising the step of removing said diluent.

4. The method of claim 3, wherein said porous, polymer electrode upon removing said diluent comprises between about 1 percent by weight and about 12 percent by weight electrically conductive particles.

5. The method of claim 3, wherein said porous, polymer electrode upon removing said diluent comprises between about 60 percent and 94 percent by weight redox active particles.

6. The method of claim 1, wherein said thermoplastic polymer comprises polyvinylidene fluoride.

7. The method of claim 1, wherein said cooling step is performed in the presence of a conductive current collector such that said current collector is embedded in said porous, polymer electrode.

8. A method of producing a porous, polymer article comprising providing a composition comprising a porous, polymer film and particles dispersed in said film, the amount of said particles being at least about 25% by volume of said composition, and heating said composition to a temperature within about 20° C. of the melting point of said polymer for a time sufficient to narrow distribution of pore sizes of said film without substantially altering structural integrity of said film.

9. The method of claim 8, further comprising calendering said porous, polymer film to reduce void volume.

* * * * *

UNITED STATES PATENT AND TRADEMARK OFFICE
CERTIFICATE OF CORRECTION

PATENT NO. : 6,143,216
DATED : November 7, 2000
INVENTOR(S) : Robert B. Loch, James M. Larson, Brian D. Fredericksen It is certified that error appears in the above-identified patent and that said Letters Patent is hereby corrected as shown below:

Column 3,
Line 6, "thee" should read -- the --;

Column 4,
Line 63, "string" should read -- strong --;

Column 5,
Line 53, "$LiCo_xN_1\text{-}O2$" should read -- $LiCo_xNi_{1-x}O_2$ --;

Column 6,
Line 44, "reactions appropriate" should read -- reactions. Appropriate --;

Column 7,
Line 43, "the(diluent" should read -- the diluent --;

Column 8,
Line 4, "amiies" should read  amides --;
Line 15, "ohthalate" should read -- phthalate --;
Line 30, "polymerize" should read -- polymers --;

Column 10,
Line 8, "regardless) of the" should read -- regardless of the --;

Column 11,
Line 24, "achieves" should read -- achieved --;

Column 12,
Line 39, "degrees" should read -- degas --;

Column 14,
Line 46, "polyamicies" should read -- polyamides --;

Column 21,
Line 37, "L800" should read -- 1800 --;
Line 43, "degrees" should read -- degas --;

Column 24,
Line 19, "58.1 g" should read -- 58.8g --;
Line 28, "7.86 9" should read -- 7.86 g --;
Line 28, "(grace" should read -- (grade --;
Line 49, "height" should read -- weight --;

UNITED STATES PATENT AND TRADEMARK OFFICE
CERTIFICATE OF CORRECTION

PATENT NO.    : 6,143,216
DATED         : November 7, 2000
INVENTOR(S)   : Robert B. Loch, James M. Larson, Brian D. Fredericksen It is certified that error appears in the above-identified patent and that said Letters Patent is hereby corrected as shown below:

Column 26,
Line 6, "65.8 9" should read -- 65.8 g --;
Line 10, "(glade" should read -- (grade --;

Column 27,
Line 48, "a:" should read -- as --;
Line 67, "0.07" should read -- 0.007 --;

Column 28,
Line 23, "0.00.8." should read -- 0.008. --;
Line 39, "mills" should read -- mils --;
Line 63, "eased" should read -- based --;

Column 30,
Line 8, "900" should read -- 90° --;
Line 10, "an(i" should read -- and --;
Line 60, "an." should read -- cm. --;

Column 33,
Line 4, "cycle" should read -- cycler --;
Line 47, "1 ohms." should read -- 4.1 ohms. --;
Line 67, "boy" should read -- box --;

Column 34,
Line 4, "0.93 9" should read -- 0.93 g --;

Column 35,
Line 57, "0.0)765" should read -- 0.00765

Signed and Sealed this

First Day of January, 2002

Attest:

Attesting Officer

JAMES E. ROGAN
Director of the United States Patent and Trademark Office